(12) United States Patent
Bookbinder et al.

(10) Patent No.: US 11,492,291 B2
(45) Date of Patent: Nov. 8, 2022

(54) ION EXCHANGED GLASSES VIA NON-ERROR FUNCTION COMPRESSIVE STRESS PROFILES

(71) Applicant: CORNING INCORPORATED, Corning, NY (US)

(72) Inventors: Dana Craig Bookbinder, Corning, NY (US); Richard Michael Fiacco, Corning, NY (US); Timothy Michael Gross, Corning, NY (US); Stephan Lvovich Logunov, Corning, NY (US)

(73) Assignee: Corning Incorporated, Corning, NY (US)

( * ) Notice: Subject to any disclaimer, the term of this patent is extended or adjusted under 35 U.S.C. 154(b) by 526 days.

(21) Appl. No.: 15/640,726

(22) Filed: Jul. 3, 2017

(65) Prior Publication Data

US 2017/0297956 A1    Oct. 19, 2017

Related U.S. Application Data

(60) Division of application No. 14/874,849, filed on Oct. 5, 2015, now Pat. No. 9,718,727, which is a
(Continued)

(51) Int. Cl.
*C03C 21/00* (2006.01)
*C03C 23/00* (2006.01)

(52) U.S. Cl.
CPC .......... *C03C 21/002* (2013.01); *C03C 23/007* (2013.01); *Y10T 428/315* (2015.01)

(58) Field of Classification Search
None
See application file for complete search history.

(56) References Cited

U.S. PATENT DOCUMENTS

| 1,960,121 A | 5/1934 | Moulton |
| 3,107,196 A | 10/1963 | Acloque |

(Continued)

FOREIGN PATENT DOCUMENTS

| AU | 6452265 A | 10/1965 |
| AU | 2011212982 A1 | 8/2012 |

(Continued)

OTHER PUBLICATIONS

Ex Parte Danielson et al., Appeal No. 2017-005432 in U.S. Appl. No. 14/270,796 (Year: 2019).*

(Continued)

*Primary Examiner* — David Sample
(74) *Attorney, Agent, or Firm* — Jeffrey A. Schmidt

(57) ABSTRACT

Glasses with compressive stress profiles that allow higher surface compression and deeper depth of layer (DOL) than is allowable in glasses with stress profiles that follow the complementary error function at a given level of stored tension. In some instances, a buried layer or local maximum of increased compression, which can alter the direction of cracking systems, is present within the depth of layer. Theses compressive stress profiles are achieved by a three step process that includes a first ion exchange step to create compressive stress and depth of layer that follows the complimentary error function, a heat treatment at a temperature below the strain point of the glass to partially relax the stresses in the glass and diffuse larger alkali ions to a greater depth, and a re-ion-exchange at short times to re-establish high compressive stress at the surface.

11 Claims, 9 Drawing Sheets

Related U.S. Application Data continuation of application No. 13/772,888, filed on Feb. 21, 2013, now Pat. No. 9,359,251.

(60) Provisional application No. 61/604,654, filed on Feb. 29, 2012.

(56) References Cited

U.S. PATENT DOCUMENTS

| | | |
|---|---|---|
| 3,357,876 A | 12/1967 | Reinhart |
| 3,380,818 A | 4/1968 | Smith |
| 3,404,015 A | 10/1968 | Dumbaugh, Jr. |
| 3,410,673 A | 11/1968 | Marusak |
| 3,433,611 A | 3/1969 | Saunders et al. |
| 3,464,880 A | 9/1969 | Rinehart |
| 3,489,097 A | 1/1970 | Gemeinhardt |
| 3,490,984 A | 1/1970 | Petticrew et al. |
| 3,597,305 A | 8/1971 | Giffen |
| 3,625,718 A | 12/1971 | Petticrew |
| 3,639,198 A | 2/1972 | Plumat et al. |
| 3,656,923 A | 4/1972 | Garfinkel et al. |
| 3,660,060 A | 5/1972 | Spanoudis |
| 3,673,049 A | 6/1972 | Giffen et al. |
| 3,737,294 A | 6/1973 | Dumbaugh et al. |
| 3,746,526 A | 7/1973 | Giffon |
| 3,765,855 A | 10/1973 | Larrick |
| 3,798,013 A | 3/1974 | Inoue et al. |
| 3,811,855 A | 5/1974 | Stockdale et al. |
| 3,833,388 A | 9/1974 | Ohlberg et al. |
| 3,844,754 A | 10/1974 | Grubb et al. |
| 3,879,183 A | 4/1975 | Carlson |
| 3,907,577 A | 9/1975 | Kiefer et al. |
| 3,931,438 A | 1/1976 | Beall et al. |
| 3,936,287 A | 2/1976 | Beall et al. |
| 3,958,052 A | 5/1976 | Galusha et al. |
| 3,959,000 A | 5/1976 | Nakagawa et al. |
| 4,042,405 A | 8/1977 | Krohn et al. |
| 4,053,679 A | 10/1977 | Rinehart |
| 4,055,703 A | 10/1977 | Rinehart |
| 4,102,664 A | 7/1978 | Dumbaugh, Jr. |
| 4,130,437 A | 12/1978 | Mazeau et al. |
| 4,148,661 A | 4/1979 | Kerko et al. |
| 4,156,755 A | 5/1979 | Rinehart |
| 4,190,451 A | 2/1980 | Hares et al. |
| 4,192,688 A | 3/1980 | Babcock |
| 4,214,886 A | 7/1980 | Shay et al. |
| 4,240,836 A | 12/1980 | Borrelli et al. |
| 4,242,117 A | 12/1980 | Van Ass |
| 4,358,542 A | 11/1982 | Hares et al. |
| 4,407,966 A | 10/1983 | Kerko et al. |
| 4,468,534 A | 8/1984 | Boddicker |
| 4,471,024 A | 9/1984 | Pargamin et al. |
| 4,483,700 A | 11/1984 | Forker et al. |
| 4,537,612 A | 8/1985 | Borrelli et al. |
| 4,608,349 A | 8/1986 | Kerko et al. |
| 4,702,042 A | 10/1987 | Herrington et al. |
| 4,726,981 A | 2/1988 | Pierson et al. |
| 4,757,162 A | 7/1988 | Dumora et al. |
| 4,857,485 A | 8/1989 | Brennan et al. |
| 5,270,269 A | 12/1993 | Hares et al. |
| 5,273,827 A | 12/1993 | Francis |
| 5,322,819 A | 6/1994 | Araujo et al. |
| 5,342,426 A | 8/1994 | Dumbaugh, Jr. |
| 5,350,607 A | 9/1994 | Tyson et al. |
| 5,559,060 A | 9/1996 | Dumgaugh, Jr. et al. |
| 5,763,343 A | 6/1998 | Brix et al. |
| 5,773,148 A | 6/1998 | Charrue et al. |
| 5,804,317 A | 9/1998 | Charrue |
| 5,895,768 A | 4/1999 | Speit |
| 5,972,460 A | 10/1999 | Tachiwana |
| 6,111,821 A | 8/2000 | Bach |
| 6,187,441 B1 | 2/2001 | Takeuchi et al. |
| 6,333,286 B1 | 12/2001 | Kurachi et al. |
| 6,376,402 B1 | 4/2002 | Pannhorst et al. |
| 6,413,892 B1 | 7/2002 | Koyama et al. |
| 6,440,531 B1 | 8/2002 | Kurachi et al. |
| 6,472,068 B1 | 10/2002 | Glass et al. |
| 6,514,149 B2 | 2/2003 | Yoon |
| 6,516,634 B1 | 2/2003 | Green et al. |
| 6,518,211 B1 | 2/2003 | Bradshaw et al. |
| 6,528,440 B1 | 3/2003 | Vilato et al. |
| 6,537,938 B1 | 3/2003 | Miyazaki |
| 6,607,999 B2 | 8/2003 | Hachitani |
| 6,689,704 B2 | 2/2004 | Ota et al. |
| 6,846,760 B2 | 1/2005 | Siebers et al. |
| 7,007,512 B2 | 3/2006 | Kamada et al. |
| 7,091,141 B2 | 8/2006 | Horsfall et al. |
| 7,176,528 B2 | 2/2007 | Couillard et al. |
| 7,476,633 B2 | 1/2009 | Comte et al. |
| 7,514,149 B2 | 4/2009 | Bocko et al. |
| 7,531,475 B2 | 5/2009 | Kishimoto et al. |
| 7,619,283 B2 | 11/2009 | Gadkaree |
| 7,666,511 B2 | 2/2010 | Ellison et al. |
| 7,687,419 B2 | 3/2010 | Kawai |
| 7,727,917 B2 | 6/2010 | Shelestak et al. |
| 7,838,136 B2 | 11/2010 | Nakashima et al. |
| 7,891,212 B2 | 2/2011 | Isono |
| 8,007,913 B2 | 8/2011 | Coppola et al. |
| 8,075,999 B2 † | 12/2011 | Barefoot |
| 8,099,982 B2 | 1/2012 | Takagi et al. |
| 8,143,179 B2 | 3/2012 | Aitken et al. |
| 8,158,543 B2 | 4/2012 | Dejneka et al. |
| 8,193,128 B2 | 6/2012 | Hellmann et al. |
| 8,232,218 B2 | 7/2012 | Dejneka et al. |
| 8,252,708 B2 | 8/2012 | Morena et al. |
| 8,312,739 B2 | 11/2012 | Lee et al. |
| 8,312,789 B2 | 11/2012 | Beck |
| 8,327,666 B2 | 12/2012 | Harvey et al. |
| 8,347,651 B2 | 1/2013 | Abramov et al. |
| 8,349,455 B2 | 1/2013 | Kondo et al. |
| 8,415,013 B2 | 4/2013 | Barefoot et al. |
| 8,431,502 B2 | 4/2013 | Dejneka et al. |
| 8,561,429 B2 | 10/2013 | Allan et al. |
| 8,580,411 B2 | 11/2013 | Endo et al. |
| 8,586,492 B2 | 11/2013 | Barefoot et al. |
| 8,623,776 B2 | 1/2014 | Dejneka et al. |
| 8,652,978 B2 | 2/2014 | Dejneka et al. |
| 8,656,734 B2 | 2/2014 | Zou et al. |
| 8,691,711 B2 | 4/2014 | Nakashima et al. |
| 8,697,592 B2 | 4/2014 | Ikenishi et al. |
| 8,713,972 B2 | 5/2014 | Lakota et al. |
| 8,756,262 B2 | 6/2014 | Zhang |
| 8,759,238 B2 | 6/2014 | Chapman et al. |
| 8,765,262 B2 | 7/2014 | Gross |
| 8,778,820 B2 | 7/2014 | Gomez et al. |
| 8,783,063 B2 | 7/2014 | Osakabe et al. |
| 8,802,581 B2 | 8/2014 | Dejneka et al. |
| 8,854,623 B2 | 10/2014 | Fontaine et al. |
| 8,932,510 B2 | 1/2015 | Li et al. |
| 8,943,855 B2 | 2/2015 | Gomez et al. |
| 8,946,103 B2 | 2/2015 | Dejneka et al. |
| 8,950,215 B2 | 2/2015 | Rappoport et al. |
| 8,951,927 B2 | 2/2015 | Dejneka et al. |
| 8,957,374 B2 | 2/2015 | Liu et al. |
| 8,969,226 B2 | 3/2015 | Dejneka et al. |
| 8,975,374 B2 | 3/2015 | Kimura |
| 9,003,835 B2 | 4/2015 | Lock |
| 9,007,878 B2 | 4/2015 | Matsumoto et al. |
| 9,139,469 B2 | 9/2015 | Comte et al. |
| 9,140,543 B1 | 9/2015 | Allan et al. |
| 9,145,329 B2 | 9/2015 | Drake et al. |
| 9,156,724 B2 | 10/2015 | Gross |
| 9,193,625 B2 | 11/2015 | Bookbinder et al. |
| 9,212,288 B2 | 12/2015 | Fujiwara et al. |
| 9,272,945 B2 | 3/2016 | Smith |
| 9,290,407 B2 | 3/2016 | Barefoot et al. |
| 9,290,413 B2 | 3/2016 | Dejneka et al. |
| 9,346,703 B2 | 5/2016 | Bookbinder et al. |
| 9,359,251 B2 | 6/2016 | Bookbinder et al. |
| 9,487,434 B2 | 11/2016 | Amin et al. |
| 9,498,822 B2 | 11/2016 | Brandt et al. |
| 9,499,431 B2 | 11/2016 | Barefoot et al. |
| 9,593,042 B2 | 3/2017 | Hu et al. |
| 9,604,876 B2 | 3/2017 | Gy et al. |
| 9,701,569 B2 | 7/2017 | Demartino et al. |

(56) References Cited

U.S. PATENT DOCUMENTS

| | | |
|---|---|---|
| 9,751,802 B2 | 9/2017 | Allan et al. |
| 9,908,811 B2 | 3/2018 | Gross et al. |
| 9,977,470 B2 | 5/2018 | Demartino et al. |
| 10,017,417 B2 | 7/2018 | Dejneka et al. |
| 10,144,670 B2 * | 12/2018 | Akatsuka ............... C03C 3/085 |
| 10,160,688 B2 | 12/2018 | Amin et al. |
| 10,239,784 B2 | 3/2019 | Oram et al. |
| 10,259,746 B2 | 4/2019 | Hu et al. |
| 10,570,059 B2 | 2/2020 | Dejneka et al. |
| 10,579,106 B2 | 3/2020 | Demartino et al. |
| 10,787,387 B2 | 9/2020 | Gross et al. |
| 2002/0023463 A1 | 2/2002 | Siebers et al. |
| 2005/0090377 A1 | 4/2005 | Shelestak et al. |
| 2005/0099618 A1 | 5/2005 | Difoggio et al. |
| 2005/0143247 A1 | 6/2005 | Siebers et al. |
| 2005/0221044 A1 | 10/2005 | Gaume et al. |
| 2005/0250639 A1 | 11/2005 | Siebers et al. |
| 2006/0127679 A1 | 6/2006 | Gulati et al. |
| 2006/0279217 A1 | 12/2006 | Peuchert et al. |
| 2007/0060465 A1 | 3/2007 | Varshneya et al. |
| 2007/0122580 A1 | 5/2007 | Krall et al. |
| 2007/0123410 A1 | 5/2007 | Morena et al. |
| 2007/0218262 A1 | 9/2007 | Degand et al. |
| 2008/0026927 A1 | 1/2008 | Monique Comte |
| 2008/0128953 A1 | 6/2008 | Nagai et al. |
| 2008/0241603 A1 | 10/2008 | Isono |
| 2008/0286548 A1 | 11/2008 | Ellison et al. |
| 2009/0142568 A1 | 6/2009 | Dejenka et al. |
| 2009/0197088 A1 | 8/2009 | Murata |
| 2009/0215607 A1 | 8/2009 | Dejneka et al. |
| 2009/0220761 A1 | 9/2009 | Dejneka et al. |
| 2009/0286091 A1 | 11/2009 | Danielson et al. |
| 2010/0009154 A1† | 1/2010 | Allan |
| 2010/0028607 A1 | 2/2010 | Lee et al. |
| 2010/0029460 A1 | 2/2010 | Shojiya et al. |
| 2010/0035038 A1 | 2/2010 | Barefoot et al. |
| 2010/0035745 A1 | 2/2010 | Murata |
| 2010/0087307 A1 | 4/2010 | Murata et al. |
| 2010/0112341 A1 | 5/2010 | Takagi et al. |
| 2010/0119846 A1 | 5/2010 | Sawada |
| 2010/0190038 A1 | 7/2010 | Osakabe et al. |
| 2010/0200804 A1 | 8/2010 | Woodruff et al. |
| 2010/0210442 A1 | 8/2010 | Abramov et al. |
| 2010/0215996 A1 | 8/2010 | Wendling et al. |
| 2010/0291353 A1 | 11/2010 | Dejneka et al. |
| 2010/0326657 A1 | 12/2010 | Hellmann et al. |
| 2011/0014475 A1 | 1/2011 | Murata |
| 2011/0064951 A1 | 3/2011 | Fujiwara et al. |
| 2011/0067447 A1 | 3/2011 | Zadesky et al. |
| 2011/0092353 A1 | 4/2011 | Amin et al. |
| 2011/0165393 A1 | 7/2011 | Bayne et al. |
| 2011/0201490 A1 | 8/2011 | Barefoot et al. |
| 2011/0226832 A1 | 9/2011 | Bayne et al. |
| 2011/0281093 A1 | 11/2011 | Gulati et al. |
| 2011/0293942 A1 | 12/2011 | Cornejo et al. |
| 2011/0294648 A1 | 12/2011 | Chapman et al. |
| 2011/0294649 A1 | 12/2011 | Gomez et al. |
| 2011/0312483 A1 | 12/2011 | Nakashima et al. |
| 2012/0015150 A1 | 1/2012 | Suzuki |
| 2012/0021898 A1 | 1/2012 | Elam et al. |
| 2012/0040146 A1 | 2/2012 | Garner et al. |
| 2012/0048604 A1 | 3/2012 | Cornejo et al. |
| 2012/0052271 A1 | 3/2012 | Gomez et al. |
| 2012/0052275 A1 | 3/2012 | Hashimoto et al. |
| 2012/0083401 A1 | 4/2012 | Koyama et al. |
| 2012/0114955 A1 | 5/2012 | Almoric et al. |
| 2012/0135153 A1 | 5/2012 | Osakabe et al. |
| 2012/0135226 A1 | 5/2012 | Bookbinder et al. |
| 2012/0135848 A1 | 5/2012 | Beall et al. |
| 2012/0171497 A1 | 7/2012 | Koyama et al. |
| 2012/0189843 A1 | 7/2012 | Chang et al. |
| 2012/0194974 A1 | 8/2012 | Weber et al. |
| 2012/0196110 A1 | 8/2012 | Murata et al. |
| 2012/0216565 A1 | 8/2012 | Allan et al. |
| 2012/0216569 A1 | 8/2012 | Allan et al. |
| 2012/0219792 A1 | 8/2012 | Yamamoto et al. |
| 2012/0236526 A1 | 9/2012 | Weber |
| 2012/0264585 A1 | 10/2012 | Ohara et al. |
| 2012/0297829 A1 | 11/2012 | Endo et al. |
| 2012/0308827 A1 | 12/2012 | Boek et al. |
| 2012/0321898 A1 | 12/2012 | Meinhardt et al. |
| 2013/0004758 A1 | 1/2013 | Dejneka et al. |
| 2013/0007458 A1 | 1/2013 | Wakita et al. |
| 2013/0017380 A1 | 1/2013 | Murata et al. |
| 2013/0045375 A1 | 2/2013 | Gross |
| 2013/0050992 A1 | 2/2013 | Schneider et al. |
| 2013/0101596 A1 | 4/2013 | Demartino et al. |
| 2013/0101798 A1 | 4/2013 | Hashimoto |
| 2013/0122260 A1 | 5/2013 | Liang |
| 2013/0122284 A1 | 5/2013 | Gross |
| 2013/0183512 A1 | 7/2013 | Gy et al. |
| 2013/0186139 A1 | 7/2013 | Tanii |
| 2013/0189486 A1 | 7/2013 | Wang et al. |
| 2013/0202868 A1 | 8/2013 | Barefoot et al. |
| 2013/0203583 A1 | 8/2013 | Zhang et al. |
| 2013/0219966 A1 | 8/2013 | Hasegawa et al. |
| 2013/0224492 A1 | 8/2013 | Bookbinder et al. |
| 2013/0236666 A1 | 9/2013 | Bookbinder et al. |
| 2013/0236699 A1 | 9/2013 | Prest et al. |
| 2013/0240025 A1 | 9/2013 | Bersano et al. |
| 2013/0260154 A1 | 10/2013 | Allan et al. |
| 2013/0274085 A1 | 10/2013 | Beall et al. |
| 2013/0288001 A1 | 10/2013 | Murata et al. |
| 2013/0288010 A1 | 10/2013 | Akarapu et al. |
| 2013/0309613 A1 | 11/2013 | O'Malley et al. |
| 2013/0323444 A1 | 12/2013 | Ehemann et al. |
| 2014/0023865 A1 | 1/2014 | Comte et al. |
| 2014/0050911 A1 | 2/2014 | Mauro et al. |
| 2014/0063393 A1 | 3/2014 | Zhong et al. |
| 2014/0066284 A1 | 3/2014 | Hashimoto et al. |
| 2014/0087159 A1 | 3/2014 | Cleary et al. |
| 2014/0087193 A1 | 3/2014 | Cites et al. |
| 2014/0087194 A1 | 3/2014 | Dejneka et al. |
| 2014/0090864 A1 | 4/2014 | Paulson |
| 2014/0092377 A1 | 4/2014 | Liu et al. |
| 2014/0093702 A1 | 4/2014 | Kitajima |
| 2014/0106141 A1 | 4/2014 | Bellman et al. |
| 2014/0106172 A1 | 4/2014 | Dejneka et al. |
| 2014/0109616 A1 | 4/2014 | Varshneya |
| 2014/0113141 A1 | 4/2014 | Yamamoto et al. |
| 2014/0134397 A1 | 5/2014 | Amin et al. |
| 2014/0139978 A1 | 5/2014 | Kwong |
| 2014/0141226 A1 | 5/2014 | Bookbinder et al. |
| 2014/0147576 A1 | 5/2014 | Lewis et al. |
| 2014/0150525 A1 | 6/2014 | Okawa et al. |
| 2014/0151370 A1 | 6/2014 | Chang et al. |
| 2014/0154661 A1 | 6/2014 | Bookbinder et al. |
| 2014/0170380 A1 | 6/2014 | Murata et al. |
| 2014/0193606 A1 | 7/2014 | Kwong |
| 2014/0220327 A1 | 8/2014 | Adib et al. |
| 2014/0227523 A1 | 8/2014 | Dejneka et al. |
| 2014/0227524 A1 | 8/2014 | Ellison et al. |
| 2014/0227525 A1 | 8/2014 | Matsuda et al. |
| 2014/0248495 A1 | 9/2014 | Matsuda et al. |
| 2014/0308526 A1 | 10/2014 | Chapman et al. |
| 2014/0321124 A1 | 10/2014 | Schneider et al. |
| 2014/0329660 A1 | 11/2014 | Barefoot et al. |
| 2014/0335330 A1 | 11/2014 | Bellman et al. |
| 2014/0356576 A1 | 12/2014 | Dejneka et al. |
| 2014/0356605 A1 | 12/2014 | Adib et al. |
| 2014/0364298 A1 | 12/2014 | Ohara et al. |
| 2014/0370264 A1 | 12/2014 | Ohara et al. |
| 2014/0370302 A1 | 12/2014 | Amin et al. |
| 2015/0004390 A1 | 1/2015 | Kawamoto et al. |
| 2015/0011811 A1 | 1/2015 | Pavone et al. |
| 2015/0027169 A1 | 1/2015 | Fredholm |
| 2015/0030834 A1 | 1/2015 | Morey et al. |
| 2015/0030838 A1 | 1/2015 | Sellier et al. |
| 2015/0037543 A1 | 2/2015 | Keegan et al. |
| 2015/0037586 A1 | 2/2015 | Gross |
| 2015/0044473 A1 | 2/2015 | Murata et al. |
| 2015/0052949 A1 | 2/2015 | Bayne et al. |
| 2015/0060401 A1 | 3/2015 | Chang et al. |
| 2015/0064472 A1 | 3/2015 | Gross et al. |

(56) References Cited

U.S. PATENT DOCUMENTS

| | | |
|---|---|---|
| 2015/0064474 A1 | 3/2015 | Dejneka et al. |
| 2015/0074974 A1 | 3/2015 | Pesansky et al. |
| 2015/0079398 A1 | 3/2015 | Amin et al. |
| 2015/0093581 A1 | 4/2015 | Murata et al. |
| 2015/0111030 A1 | 4/2015 | Miyasaka et al. |
| 2015/0132563 A1 | 5/2015 | O'Malley et al. |
| 2015/0140325 A1 | 5/2015 | Gross et al. |
| 2015/0144291 A1 | 5/2015 | Brandt et al. |
| 2015/0147574 A1 | 5/2015 | Allan et al. |
| 2015/0147575 A1 | 5/2015 | Dejneka et al. |
| 2015/0147576 A1 | 5/2015 | Bookbinder et al. |
| 2015/0152003 A1 | 6/2015 | Kawamoto et al. |
| 2015/0157533 A1 | 6/2015 | Demartino et al. |
| 2015/0166401 A1 | 6/2015 | Yamamoto |
| 2015/0166407 A1 | 6/2015 | Varshneya et al. |
| 2015/0175469 A1 | 6/2015 | Tabe |
| 2015/0183680 A1 | 7/2015 | Barefoot et al. |
| 2015/0239775 A1 | 8/2015 | Amin et al. |
| 2015/0239776 A1 | 8/2015 | Amin et al. |
| 2015/0251947 A1 | 9/2015 | Lestrigant et al. |
| 2015/0259244 A1 | 9/2015 | Amin et al. |
| 2015/0261363 A1 | 9/2015 | Shah et al. |
| 2015/0274585 A1 | 10/2015 | Rogers et al. |
| 2015/0329413 A1 | 11/2015 | Beall et al. |
| 2015/0329418 A1 | 11/2015 | Murata et al. |
| 2015/0368148 A1 | 12/2015 | Duffy et al. |
| 2015/0368153 A1 | 12/2015 | Pesansky et al. |
| 2016/0083291 A1 | 3/2016 | Dogimont et al. |
| 2016/0102011 A1 | 4/2016 | Hu et al. |
| 2016/0102014 A1 | 4/2016 | Hu et al. |
| 2016/0107924 A1 | 4/2016 | Yamamoto et al. |
| 2016/0122239 A1 | 5/2016 | Amin et al. |
| 2016/0122240 A1* | 5/2016 | Oram .................. C03C 3/097 428/220 |
| 2016/0187994 A1 | 6/2016 | La et al. |
| 2016/0318796 A1 | 11/2016 | Masuda |
| 2017/0022092 A1 | 1/2017 | Demartino et al. |
| 2017/0022093 A1 | 1/2017 | Demartino et al. |
| 2017/0158556 A1 | 6/2017 | Dejneka et al. |
| 2017/0166478 A1 | 6/2017 | Gross et al. |
| 2017/0197869 A1 | 7/2017 | Beall et al. |
| 2017/0197870 A1 | 7/2017 | Finkeldey et al. |
| 2017/0291849 A1 | 10/2017 | Dejneka et al. |
| 2017/0295657 A1 | 10/2017 | Gross et al. |
| 2017/0305786 A1 | 10/2017 | Roussev et al. |
| 2019/0208652 A1 | 7/2019 | Gross et al. |

FOREIGN PATENT DOCUMENTS

| | | |
|---|---|---|
| CN | 1312582 A | 9/2001 |
| CN | 1693247 A | 11/2005 |
| CN | 1699230 A | 11/2005 |
| CN | 1759074 A | 4/2006 |
| CN | 1886348 A | 12/2006 |
| CN | 101316799 A | 12/2008 |
| CN | 101578240 A | 11/2009 |
| CN | 101583576 A | 11/2009 |
| CN | 101679106 A | 3/2010 |
| CN | 101689376 A | 3/2010 |
| CN | 102026929 A | 4/2011 |
| CN | 102089252 A | 6/2011 |
| CN | 102131740 A | 7/2011 |
| CN | 102149649 A | 8/2011 |
| CN | 102363567 A | 2/2012 |
| CN | 102393289 A | 3/2012 |
| CN | 102531384 A | 7/2012 |
| CN | 102690059 A | 9/2012 |
| CN | 102791646 A | 11/2012 |
| CN | 102815860 A | 12/2012 |
| CN | 102887650 A | 1/2013 |
| CN | 102898022 A | 1/2013 |
| CN | 102958855 A | 3/2013 |
| CN | 103058506 A | 4/2013 |
| CN | 103058507 A | 4/2013 |
| CN | 103068759 A | 4/2013 |
| CN | 103097319 A | 5/2013 |
| CN | 103282318 A | 9/2013 |
| CN | 103338926 A | 10/2013 |
| CN | 103569015 A | 2/2014 |
| CN | 103648996 A | 3/2014 |
| CN | 103946166 A | 7/2014 |
| CN | 104379522 A | 2/2015 |
| CN | 104736496 A | 6/2015 |
| CN | 105753314 A | 7/2016 |
| CN | 108046589 A | 5/2018 |
| EP | 0132751 A1 | 2/1985 |
| EP | 0163873 A1 | 12/1985 |
| EP | 0700879 A1 | 3/1996 |
| EP | 0931028 A1 | 7/1999 |
| EP | 1291631 A1 | 3/2003 |
| EP | 1314704 A1 | 5/2003 |
| EP | 1593658 A1 | 11/2005 |
| EP | 2263979 A1 | 12/2010 |
| EP | 2397449 A1 | 12/2011 |
| EP | 2415724 A1 | 2/2012 |
| EP | 2531459 A2 | 12/2012 |
| EP | 2540682 A1 | 1/2013 |
| EP | 2594536 A1 | 5/2013 |
| EP | 2609047 A1 | 7/2013 |
| EP | 2646243 A1 | 10/2013 |
| EP | 2666756 A1 | 11/2013 |
| EP | 2695734 A1 | 2/2014 |
| EP | 2736855 | 6/2014 |
| EP | 2762459 A1 | 8/2014 |
| EP | 2762460 A1 | 8/2014 |
| EP | 3204338 A2 | 8/2017 |
| GB | 1012367 | 12/1965 |
| GB | 1026770 A | 4/1966 |
| GB | 1089912 A | 11/1967 |
| GB | 1105433 A | 3/1968 |
| GB | 1334828 A | 10/1973 |
| JP | 47-004192 U | 9/1972 |
| JP | 54-83923 A † | 7/1979 |
| JP | 1979083923 A | 7/1979 |
| JP | 62-187140 A | 8/1987 |
| JP | 02-293345 A | 12/1990 |
| JP | 1995263318 A | 10/1995 |
| JP | 11-328601 A | 11/1999 |
| JP | 2000-203872 A | 7/2000 |
| JP | 2000-327365 A | 11/2000 |
| JP | 2001-076336 A | 3/2001 |
| JP | 2001-354446 A | 12/2001 |
| JP | 2002-115071 A | 4/2002 |
| JP | 2002-174810 A | 6/2002 |
| JP | 2002-358626 A | 12/2002 |
| JP | 2003-505327 A | 2/2003 |
| JP | 2003-283028 A | 10/2003 |
| JP | 2004-099370 A | 4/2004 |
| JP | 2004259402 A | 9/2004 |
| JP | 2005-062592 A | 3/2005 |
| JP | 2005-139031 A | 6/2005 |
| JP | 2005-519997 A | 7/2005 |
| JP | 2005-206406 A | 8/2005 |
| JP | 2005-289683 A | 10/2005 |
| JP | 2005-289685 A | 10/2005 |
| JP | 2005-320234 A | 11/2005 |
| JP | 2006-228431 A | 8/2006 |
| JP | 2007-527354 A | 9/2007 |
| JP | 2007-252589 A | 10/2007 |
| JP | 2007-255139 A | 10/2007 |
| JP | 2007-255319 A | 10/2007 |
| JP | 2007-314521 A | 12/2007 |
| JP | 2008-007384 A | 1/2008 |
| JP | 2008-094713 A | 4/2008 |
| JP | 2008-115071 A | 5/2008 |
| JP | 2009-084076 A | 4/2009 |
| JP | 2009-099239 A | 5/2009 |
| JP | 2009-107878 A | 5/2009 |
| JP | 2009-274902 A | 11/2009 |
| JP | 2009-280478 A | 12/2009 |
| JP | 2010-202514 A | 9/2010 |
| JP | 2011057504 A | 3/2011 |
| JP | 2011-213576 A | 10/2011 |

(56) References Cited

FOREIGN PATENT DOCUMENTS

| | | |
|---|---|---|
| JP | 2011-527661 | 11/2011 |
| JP | 2011-530470 A | 12/2011 |
| JP | 2012-066995 A | 4/2012 |
| JP | 2012-232882 A | 11/2012 |
| JP | 2013-502371 A | 1/2013 |
| JP | 2013-028512 A | 2/2013 |
| JP | 2013-518800 A | 5/2013 |
| JP | 2013-520388 A | 6/2013 |
| JP | 2013-529172 A | 7/2013 |
| JP | 2013-536155 A | 9/2013 |
| JP | 2013-542159 A | 11/2013 |
| JP | 2014-501214 A | 1/2014 |
| JP | 2014-073953 A | 4/2014 |
| JP | 5483923 B2 | 5/2014 |
| JP | 2014-136751 A | 7/2014 |
| JP | 2014-141363 A | 8/2014 |
| JP | 2014-522798 A | 9/2014 |
| JP | 2015-511537 A | 4/2015 |
| KR | 10-2012-0128657 A | 11/2012 |
| KR | 10-1302664 B1 | 9/2013 |
| KR | 10-2013-0135840 A | 12/2013 |
| KR | 10-2014-0131558 A | 11/2014 |
| KR | 10-1506378 B1 | 3/2015 |
| KR | 10-2016-0080048 | 7/2016 |
| RU | 2127711 C1 | 3/1999 |
| SG | 187326 | 2/2013 |
| SU | 1677028 A1 | 9/1991 |
| TW | 200911718 A | 3/2009 |
| TW | 201040118 A | 11/2010 |
| TW | 201313635 A | 4/2013 |
| TW | 201331148 A | 8/2013 |
| TW | 201335092 A | 9/2013 |
| TW | 201350449 A | 12/2013 |
| TW | 201402490 A | 1/2014 |
| TW | 201520178 A | 6/2015 |
| WO | 99/06334 A1 | 2/1999 |
| WO | 2000/047529 A1 | 8/2000 |
| WO | 01/07374 A1 | 2/2001 |
| WO | 2005/042423 A1 | 5/2005 |
| WO | 2005/091021 A1 | 9/2005 |
| WO | 2005/093720 A1 | 10/2005 |
| WO | 2009/041348 A1 | 4/2009 |
| WO | 2009/041618 A1 | 4/2009 |
| WO | 2010002477 A1 | 1/2010 |
| WO | 2010005578 A1 | 1/2010 |
| WO | 2010016928 A2 | 2/2010 |
| WO | 2010/147650 A2 | 12/2010 |
| WO | 2011/022661 A2 | 2/2011 |
| WO | 2011/041484 A1 | 4/2011 |
| WO | 2011/069338 A1 | 6/2011 |
| WO | 2011/077756 A1 | 6/2011 |
| WO | 2011/085190 A1 | 7/2011 |
| WO | 2011/097314 A2 | 8/2011 |
| WO | 2011/103799 A1 | 9/2011 |
| WO | 2011103798 A1 | 9/2011 |
| WO | 2011104035 A9 | 9/2011 |
| WO | 2011/149740 A1 | 12/2011 |
| WO | 2011149811 A1 | 12/2011 |
| WO | 2011149812 A1 | 12/2011 |
| WO | 2012027660 A1 | 3/2012 |
| WO | 2012/074983 A1 | 6/2012 |
| WO | 2012126394 A1 | 9/2012 |
| WO | 2013016157 A1 | 1/2013 |
| WO | 2013/018774 A1 | 2/2013 |
| WO | 2013/027651 A1 | 2/2013 |
| WO | 2013/028492 A1 | 2/2013 |
| WO | 2013/032890 A1 | 3/2013 |
| WO | 2013/047679 A1 | 4/2013 |
| WO | 2013/082246 A1 | 6/2013 |
| WO | 2013/088856 A1 | 6/2013 |
| WO | 2013/110721 A1 | 8/2013 |
| WO | 2013/116420 A1 | 8/2013 |
| WO | 2013/120721 A1 | 8/2013 |
| WO | 2013/130653 A2 | 9/2013 |
| WO | 2013/130665 A2 | 9/2013 |
| WO | 2013/130721 A1 | 9/2013 |
| WO | 2013/136013 A2 | 9/2013 |
| WO | 2013/184205 A1 | 12/2013 |
| WO | 2014/042244 A1 | 3/2014 |
| WO | 2014/052229 A1 | 4/2014 |
| WO | 2014/097623 A1 | 6/2014 |
| WO | 2014/100432 A1 | 6/2014 |
| WO | 2014/175144 A1 | 10/2014 |
| WO | 2014/180679 A1 | 11/2014 |
| WO | 2015/057552 A2 | 4/2015 |
| WO | 2015/057555 A1 | 4/2015 |
| WO | 2015/077179 A1 | 5/2015 |
| WO | 2015/080043 A1 | 6/2015 |
| WO | 2015/127483 A2 | 8/2015 |
| WO | 2015/175595 A1 | 11/2015 |
| WO | 2015/195419 A2 | 12/2015 |
| WO | 2015/195465 A1 | 12/2015 |
| WO | 2016/014937 A1 | 1/2016 |
| WO | 2016/028554 A1 | 2/2016 |
| WO | 2016/057787 A2 | 4/2016 |
| WO | 2016/070048 A1 | 5/2016 |
| WO | 2016/174825 A1 | 11/2016 |
| WO | 2016185934 A1 | 11/2016 |
| WO | 2017/030736 A1 | 2/2017 |
| WO | 2017/100646 A1 | 6/2017 |
| WO | 2017/177109 A1 | 10/2017 |
| WO | 2017/177114 A1 | 10/2017 |

OTHER PUBLICATIONS

European Patent Application No. 13709022.1 Office Action dated Apr. 16, 2018; 9 Pages European Patent Office.

English Translation of CN201810903093.7 Office Action dated Apr. 25, 2019; 14 Pages; Chinese Patent Office.

Green; "Section 2. Residual Stress, Brittle Fracture and Damage; Critical Parameters in the Processing of Engineered Stress Profile Glasses"; J. Non-Cryst Sol., 316 (2003) 35-41.

Hampshire; Section 3. Oxynitride Glasses; Oxynitride Glasses, Their Properties and Crystallisation—A Review, Journal of Non-Crystalline Solids 316 (2003) p. 64-73.

Abrams et al; "Fracture Behavior of Engineerred Stress Profile Soda Lime Silicate Glass" Jounral of Non-Crystalline Solids; 321 (2003) 10-19.

Bourhis; "Glass: Mechanics and Technology", Wiley. p. 170-174 XP007920266; 2008.

Shen et al; "Variable-Temperature Ion-Exchanged Engineered Stress Profile (ESP) Glasses"; J. Am. Ceram. Soc., 86 [11] 1979-81 (2003).

Shen et al; "Control of Concentration Profiles in Two Step Ion Exchanged Glasses"; Phys. Chem. Glasses, 2003, 44 (4), 284-92.

Smedskjaer et al; "Effect of Thermal History and Chemical Composition on Hardness of Silicate Glasses"; Journal of Non-Crystalline Solids 356 (2010) p. 893-897.

Varshenya; "Fundamentals of Inorganic Glasses; 18.12 Strengthening and Toughening"; New York State College of Ceramics, Alfred University; 2006; 10 Pages.

Varshenya; "Fundamentals of Inorganic Glasses"; New York State College of Ceramics, Alfred University; 2006; 3 Pgs.

Zimmer; "Thin Glasses for Touch Display Technologies"; Schott: Glass Made of Ideas. Emerging Display Technologies Conference, Aug. 16-17, 2011. 17 Slides.

International Search Report and Written Opinion PCT/US2013/028079 dated Aug. 27, 2013.

Aegerter et al. "Sol-gel technologies for glass producers and users—Chapter 4.1.8—Scratch resistant coatings (G. Helsch and G. H. Frischat)", pp. 217-221, Kluwer Academic Publishers, 2004.

Amin et al; U.S. Appl. No. 14/926,425, filed Oct. 29, 2015, titled "Strengthened Glass With Ultra-Deep Depth of Compression".

ASTM C1279-13 "Standard Test Method for Non-Destructive Photoelastic Measurement of Edge and Surface Stresses in Annealed, Heat-Strengthened, and Fully Tempered Flat Glass".

ASTM C1422/C1422M-10 "Standard Specification for Chemically Strengthened Flat Glass".

ASTM C158-02(2012), Standard Test Methods for Strength of Glass by Flexure (Determination of Modulus of Rupture), ASTM International, West Conshohocken, PA, 2012, 9 pages.

(56) References Cited

OTHER PUBLICATIONS

Bahlawane "Novel sol-gel process depositing a-Al2O3 for the improvement of graphite oxidation-resistance"—Thin Solid Films, vol. 396, pp. 126-130, 2001.
Bansal et al; "Chapter 10: Elastic Properties" Handbook of Glass Properties; Elsevier; (1986) pp. 306-336.
Bansal et al; "Handbook of Glass Properties"; Elsevier; (1986) 2 pages.
Bouyne et al; "Fragmentation of thin chemically tempered glass plates"; Glass Technol., 2002, 43C, 300-2.
Brandt et al; "Mechanics of Ceramics, Active Materials, Nanoscale Materials, Composites, Glass, and Fundamentals"; Proceedings of the 8th International Symposium on Fracture Mechanics of Ceramics, (2003); 11 Pages.
Brunkov et al; "Submicron-Resolved Relief Formation in Poled Glasses and Glass-Metal Nanocomposites"; Technical Physics Letters, 2008, vol. 34, No. 12 pp. 1030-1033.
Bubsey, R.T. et al., "Closed-Form Expressions for Crack-Mouth Displacement and Stress Intensity Factors for Chevron-Notched Short Bar and Short Rod Specimens Based on Experimental Compliance Measurements," NASA Technical Memorandum 83796, pp. 1-30 (Oct. 1992).
Chinese First Office Action CN201180057659.5 dated Dec. 24, 2014, Shanghai Patent and Trademark Office, 9 Pgs.
Chinese Patent Application No. 201611141439.1 Second Office Action dated Jun. 28, 2020; 30 Pages; Chinese Patent Office.
Chinese Patent Application No. 201810008016.5, Office Action dated Oct. 19, 2020; 20 pages (12 pages of English Translation and 8 pages of Original Document); Chinese Patent Office.
Chinese Search Report; 201710228902.4; dated Jun. 10, 2020; 4 Page; Chinese Patent Office.
Chinese Search Report; 201810008010.8; dated Jun. 1, 2020; 5 Pages; Chinese Patent Office.
Chinese Search Report; 201811009613.6; dated Aug. 25, 2020; 4 Page; Chinese Patent Office.
CN201510895444.0 Second Office Action dated Apr. 10, 2018, China Patent Office.
CN201510895444.0 Second Office Action dated Aug. 17, 2018, China Patent Office.
Corning Incorporated, "What Makes CHEMCOR Glass Work?" ChemCor Product Specification, Feb. 1990, 2 pgs.
Corning leads $62M Investment in 'smart' glass maker view, Jun. 19, 2013; http://optics.org/news/4/6/27.
Corning, "Nook—Stress Profile Measurement", Corning Incorporated, 2019, 4 slides.
Declaration of Rostislav V. Roussev; 9 Pages; Aug. 11, 2019.
Dessler et al; "Differences between films and monoliths of sol-gel derived aluminas", Thin Solid Films, vol. 519, pp. 42-51, 2010.
Donald "Review Methods for Improving the Mechanical Properties of Oxide Glasses"; Journal of Materials Science 24 (1989) 4177-4208.
English Translation of CN201510895444.0 Notice of First Office Action dated Dec. 11, 2017; 6 Pages; Chinese Patent Office.
English Translation of CN201580044744.6 Office Action dated Jan. 22, 2019; 19 Pages Chinese Patent Office.
English Translation of CN201611141439.1 Notice of Second Office Action dated Oct. 19, 2018; 10 Pages; Chinese Patent Office.
English Translation of CN2018100080625 Search Report dated May 9, 2020; 2 Pages; Chinese Patent Office.
English translation of Japanese Patent Publication No. H11-328601, titled "Glass Substrate for Recording Medium, Recording Medium utilizing Glass Substrate, and Method for Manufacturing Glass Substrate for Recording Medium" Published Nov. 30, 1999. 11 pgs.
English translation of Japanese Patent Publication No. S47-004192, titled "Inorganic Glass for Watch" Published Feb. 4, 1972. 4 pgs.
English Translation of JP2014559996 Office Action dated Feb. 7, 2017, Japan Patent Office.
English Translation of JP2017157071 Office Action dated Nov. 21, 2017, Japan Patent Office, 6 Pgs.

English Translation of KR1020177012502 Office Action dated Jun. 28, 2018, Korean Intellectual Property Office, 3 Pgs.
English Translation of KR1020197037663 Office Action dated May 2, 2020; 3 Pages; Korean Patent Office.
English Translation of TW105123002 Search Report dated May 14, 2018, Taiwan Patent Office, 1 Pg.
English Translation of TW106111688 Search Report dated Apr. 26, 2019; 1 Page; Taiwan Patent Office.
English Translation of TW107106081 Search Report dated Jun. 22, 2018, Taiwan Patent Office.
English Translation of TW107106082 Search Report dated Jun. 21, 2018, Taiwan Patent Office.
English Translation of TW108142075 Office Action dated Apr. 6, 2020; 2 Pages; Taiwan Patent Office.
European Patent Application No. 13709022.1 Observations by third parties dated Mar. 25, 2020; 3 Pages; European Patent Office.
European Patent Application No. 13709022.1 Office Action dated Apr. 12, 2016; 5 Pages; European Patent Office.
European Patent Application No. 15784527.2 Observations by third parties dated Feb. 18, 2020; 21 Pages; European Patent Office.
European Patent Application No. 15784527.2 Observations by third parties dated Jan. 9, 2020; 1 Pages; European Patent Office.
European Patent Application No. 15784527.2 Office Action dated May 10, 2019; 5 Pages; European Patent Office.
European Patent Application No. 16751065.0 Office Action dated Jan. 18, 2019; 4 Pages; European Patent Office.
European Patent Application No. 16823100.9 Office Action dated Jul. 23, 2020; 9 Pages; European Patent Office.
European Patent Office First Office Action EP11799531.6-1355 dated May 2, 2014, 2 Pgs.
European Patent Office First Office Action EP11802990.9 dated Mar. 6, 2014, 6 Pgs.
European Patent Application No. 15784527.2 Summons to attend oral proceedings pursuant to Rule 115(1) EPC dated Dec. 8, 2020; 22 Pages; European Patent Office.
Sglavo et al. "procedure for residual stress profile determination by curvature measurements" Mechanics of Materias, 2005, 37(8) pp. 887-898.
Taiwan First Office Action and Search Report TW100143769 Tsai, Lee and Chen. dated Apr. 29, 2016, 3 Pgs.
Takagi et al; "Electrostatic Imprint Process for Glass"; Applied Physics Express 1 (20008) 024003.
Tang et al. "Methods for measurement and statistical analysis of the frangibility of strengthened glass" Frontiers in Materials, 2015 vol 2, article 50. 8 pgs.
Tang, et al., "Automated Apparatus for Measuring the Frangibility and Fragmentation of Strengthened Glass", Experimental Mechanics (Jun. 2014) vol. 54 pp. 903-912.
Varshneya; "Microhardness vs. Glass Composition"; Fundamentals of Inorganic Glasses; 2006; p. 208, paragraph 7.
Yong-Hwan; "Chemical Tempered Glass for Mobile Displays"; Korea Institute of Science and Technology; Date Unknown; 6 Pages.
Zheng et al; "Effect of Y2O3 addition on viscosity and crystallizationof the lithium aluminosilicate glasses"; Thermochimica Acta 456 (2007) 69-74.
Zheng et al; "Structure and Properties of the Lithium Aluminosilicate Glasses with Yttria Addition"; vol. 22, No. 2 Wuhan University of Technology—(Abstract).
Extended European Search Report and Search Opinion; 19217082.7; dated Aug. 12, 2020; 14 pages; European Patent Office.
F.V. Tooley; "The Handbook of Glass Manufacture, vol. II"; China Architecture & Building Press, First Edition, Feb. 1983, pp. 304-305.
Fu, et al, "Preparation of alumina films from a new sol-gel route" Thin Solid films 348, pp. 99-102 (1999).
Glover et al; "The interactive whiteboard: a literature survey"; Technology, Pedagogy and Education (14) 2: 155-170.
Greaves et al; "Inorganic Glasses, Glass-Forming Liquids and Amorphizing Solids", Advances in Physics; vol. 56, No. 1, Jan.-Feb. 2007, 1166.
Gulati, "Frangibility of tempered soda-lime glass sheet" Glass Processing Days, Sep. 13-15, 1997. pp. 72-76.

(56) References Cited

OTHER PUBLICATIONS

Gulati, Frangibility of Tempered Soda-Lime Glass Sheet, Glass Processing Days, The Fifth International Conference on Architectural and Automotive Glass, Sep. 13-15, 1997.
Hampshire; "Oxynitride glasses, their properties and crystallization—a review"; Journal of Non-Crystalline Solids; vol. 316, 2003; pp. 64-73.
Hauk "Sol-gel preparation of scratch-resistant Al2O3 coatings on float glass", Glass Science and Technology Glastechnische Berichte, 72(12), pp. 386, 1999.
Indian Patent Application No. 202018006461 office Action dated Sep. 22, 2020; 6 Pages; Indian Patent Office.
Indian Patent Application No. 201817021369; First Examination Report dated Dec. 24, 2019; India Patent Office; 7 Pgs.
International Search Report and the Written Opinoin of the International Searching Authority; PCT/US2015/035448; dated Sep. 18, 2015; 11 Pages.
International Search Report and Written Opinion of the International Searching Authority; PCT/US2015/023507; dated Oct. 19, 2015; 19 Pages.
International Search Report and Written Opinion of the International Searching Authority; PCT/US2015/034996 dated Jan. 4, 2016; 13 Pages.
International Search Report and Written Opinion of the International Searching Authority; PCT/US2015/054681; dated Apr. 6, 2016; 16 Pages; European Patent Office.
International Search Report and Written Opinion of the International Searching Authority; PCT/US2015/058322 dated Jan. 8, 2016; 14 Pages.
International Search Report and Written Opinion of the International Searching Authority; PCT/US2015/058919;dated Jan. 11, 2016; 11 Pages.
International Search Report and Written Opinion of the International Searching Authority; PCTUS2015041976; dated Oct. 29, 2015; 11 Pages.
International Search Report and Written Opinion PCT/US2011/062288 dated Feb. 28, 2012.
International Search Report and Written Opinion PCT/US2011/062354 dated Mar. 15, 2012.
International Search Report and Written Opinion PCT/US2016/034634 dated Nov. 2, 2016.
International Search Report and Written Opinion PCT/US2016/043610 dated Feb. 1, 2017.
International Search Report and Written Opinion PCT/US2016/085932 dated Apr. 5, 2017.
International Search Report and Written Opinion PCT/US2017/026554 dated Jul. 10, 2017.
International Search Report and Written Opinion PCT/US2017/026561 dated Jun. 19, 2017; 13 Pages; European Patent Office.
International Searching Authority Invitation to Pay Additional Fees PCT/US2016/043610 dated Dec. 8, 2016.
ISR SP14-293_PCT.
Japanese Patent Application No. 2018529948; Machine Translation of the Office Action dated Dec. 18, 2019; Japan Patent Office; 8 Pgs.
Japanese Patent Application No. 2018540470; Machine Translation of the Office Action dated Feb. 12, 2020; Japan Patent Office; 7 Pgs.
Japanese Patent Application No. 2019-005651 Notice of Reasons for Refusal dated Sep. 30, 2020; 18 Pages; Japanese Patent Office.
Japanese Patent Application No. 2019-184641 Notice of Reasons for Refusal dated Oct. 7, 2020; 7 Pages; Japanese Patent Office.
Kim; "Glass Engineering"; Glass Technology 3rd Edition; (2009) 8 Pages.
Kitaigorodskii et al, In: Sb.Nauchn.Rabot Belor.Politekhn. Inst.,Khimiya, Tekhnologiya i Istoriya Stekla i Keramiki, 1960, No. 86, p. 38. (The Synthesis of Thermo-stable glasses) Abstract Only.
Kitaigorodskii I.I. 'Sentyurin G.G.' 'Egorova L.S.', In: Sb.Nauchn. Rabot Belor.Politekhn.Inst.,Khimiya, Tekhnologiya Istoriya Stekla i Keramiki, 1960, No. 86, p. 38. (The Synthesis of Thermo-stable glasses) Abstract Only.
Le Bourhis; "Glass Mechanics and Technology"; Wiley-VCH, Second Edition; (2014) 8 Pages.
Liu et al, "Common Knowledge Evidence: Inorganic Non-Metallic Materials Technology", China University of Science and Technology Press, Sep. 2015, 1st edition.
Nagashima; "Chemical Strengthening of Glass"; Surface Technology; vol. 64, No. 8; (2013) pp. 434-438.
Oram et al; U.S. Appl. No. 14/932,411, filed Nov. 4, 2015, Titled "Deep Non-Frangible Stress Profiles and Methods of Making".
Patent Cooperation Treaty International Notification of Invitation to pay additional fees; international application No. PCT/US2015/054681: dated Dec. 14, 2015, 7 pages.
Patent Cooperation Treaty, Partial International Search Report for International Application No. PCT/US2015/054681, dated Nov. 11, 2015, 7 pages.
Peitl et al; "Thermal Shock Properties of Chemically Toughened Borosilicate Glass" Journal of Non-Crystallin Solids, 247, (1999) pp. 39-49.
Pflitsch et al; "Sol-gel deposition of chromium doped aluminum oxide films (Ruby) for surface temperature sensor application", Chem. Mater., vol. 20, pp. 2773-2778, 2008.
Poumellec et al; "Surface topography change induced by poling in Ge doped silica glass films"; 2003 OSA/BGPP 2003 MD 38.
Reddy et al. "Fracture Toughness Measurement of Glass and Ceramic Materials Using Chevron-Notched Specimens" J. Am. Ceram. Soc. 71 (6) C-310-C313 (1988).
Reddy, K.P.R. et al, "Fracture Toughness Measurement of Glass and Ceramic Materials Using Chevron-Notched Specimens," J. Am. Ceram. Soc., 71 [6], C-310-C-313 (1988).
Rusan et al; "A New Method for Recording Phase Optical Structures in Glasses"; Glass Physics and Chemistry, 2010, vol. 36, No. 4, pp. 513-516.
Russian Patent Application No. 2018105921; Russian Office Action and Search Report dated Sep. 19, 2019; Russia Patent Office; 4 Pgs.
Sglavo & Green, "Flaw-insensitive ion-exchanged glass: 11, Production and mechanical performance" J. Am. Ceram. Soc. 84(8) pp. 1832-1838 (2001).
Sglavo et al. "procedure for residual stress profile determination by vurbature measurements" Mechanics of Materias, 2005, 37(8) pp. 887-898.
Stosser et al "Magnetic Resonance investigation of the process of corundum formation starting from sol-gel precursors", J. Am. Ceram. Soc, vol. 88, No. 10, pp. 2913-2922, 2005.
European Patent Application No. 13709022.1 Observations by third parties dated Dec. 16, 2020; 4 Pages; European Patent Office.
Dusil J. et al., "Black Colored Glass Ceramics Based on Beta-Quartz Solid Solutions," Glass 1977: proceedings of the 11th International Congress on Glass, Prague, Czechoslovakia, Jul. 4-8, 1977, vol. 2, pp. 139-149.
Guo et al., "Nucleation and Crystallization Behavior of Li2O-Al2O3-SiO2 System Glass-Ceramic Containing Little Fluorine and No-Fluorine", J.Non-Cryst Solids, 2005, vol. 351, No. 24-26, pp. 2133-2137.
"Building Materials", Co-edited by Xi'an University of Architecture and Technology, China Construction Industry Press, Edition 3, Apr. 30, 2004, 5 pages.
Rukmani et al., "Effects of V and Mn Colorants on the Crystallization Behavior and Optical Properties of Ce-Doped Li-Disilicate Glass", In Journal of American Ceramic Society, vol. 90, 2007, pp. 706-711.
Chinese Patent Application No. 202011285770.7, Office Action, dated Mar. 30, 2022, 12 pages (6 pages of English Translation and 6 pages of Original Document), Chinese Patent Office.
U.S. Appl. No. 62/320,077 (Year: 2016).
U.S. Appl. No. 62/343,320 (Year: 2016).

\* cited by examiner
† cited by third party

ION EXCHANGED GLASSES VIA NON-ERROR FUNCTION COMPRESSIVE STRESS PROFILES

CROSS-REFERENCE TO RELATED APPLICATIONS

This application is a divisional of and claims the benefit of priority under 35 U.S.C. §120 of U.S. application Ser. No. 14/874,849 filed on Oct. 5, 2015, which in turn, is a continuation of and claims the benefit of priority to U.S. Pat. No. 9,359,251 granted Jun. 7, 2016, which in turn, claims the benefit of priority under 35 U.S.C. §119 of U.S. Provisional Application Ser. No. 61/604,654 filed on Feb. 29, 2012, the contents of each of which is relied upon and incorporated herein by reference in their entireties.

BACKGROUND

Chemical strengthening, also called ion-exchange (IOX), of glass refers to the exchange of smaller cation (e.g., monovalent alkali metal cations such as $Li^+$ and $Na^+$) in the glass for larger monovalent cations (e.g., $K^+$) in an external medium, such as a molten salt bath at temperatures below the strain point of the glass. The ion exchange process is used to impart a compressive stress profile extending from the surface of the glass to a particular depth following a complementary error function. High compressive stress gives high strength in bending as long as the flaw is encompassed in the depth of the compressive layer (depth of layer, or "DOL").

The stored compressive stress from both surfaces of the glass is balanced by stored tension, the allowable limit of which is set by the frangibility limit for a given glass thickness. The limits of compressive stress and depth of layer are determined by the various allowable combinations that follow the complementary error function and remain below the frangibility limit. The stored compressive stress is represented by the area under the complementary error function from the surface to the depth of layer.

SUMMARY

The present disclosure provides glasses with compressive stress profiles that allow higher surface compression and deeper depth of layer (DOL) than is allowable in glasses with stress profiles that follow the complementary error function at a given level of stored tension. In some instances, a buried layer or local maximum of increased compression, which can alter the direction of cracking systems, is present within the depth of layer. Theses compressive stress profiles are achieved by a three step process that includes a first ion exchange step to create compressive stress and depth of layer that follows the complimentary error function, a heat treatment at a temperature below the strain point of the glass to partially relax the stresses in the glass and diffuse larger alkali ions to a greater depth, and a re-ion-exchange at short times to re-establish high compressive stress at the surface.

Accordingly, one aspect of the disclosure is to provide a glass having a surface and a thickness t. The glass comprises a first region under a compressive stress, the first region extending from the surface to a depth of layer DOL in the glass, wherein the compressive stress CS has a maximum $CS_1$ at the surface and varies with distance d from the surface according to a function other than a complementary error function; and a second region under a tensile stress CT, the second region extending from the depth of layer into the glass.

A second aspect of the disclosure is to provide an ion exchanged glass having a surface and a thickness t. The glass comprises a first layer under a compressive stress CS and extending to a depth of layer DOL in the glass. The first region comprises a first segment in which the compressive stress CS varies according to a first function and a second segment in which the compressive stress CS varies according to a second function, and wherein the first function is different than the second function.

A third aspect of the disclosure is to provide a method of providing a glass with a compressive stress in a layer extending from a surface of the glass to a depth of layer in the glass. The method comprises: ion exchanging the glass with a salt comprising first cations to a first compressive stress and a first depth of layer, wherein the first compressive stress varies with distance in the glass according to a complementary error function; relaxing stresses within the glass and diffusing the first cations deeper into the glass; and re-ion exchanging the glass with a salt comprising the first cations to a second compressive stress at the surface, wherein the compressive stress varies with distance according to a function other than the complementary error function.

These and other aspects, advantages, and salient features will become apparent from the following detailed description, the accompanying drawings, and the appended claims.

DETAILED DESCRIPTION

Figure 1:
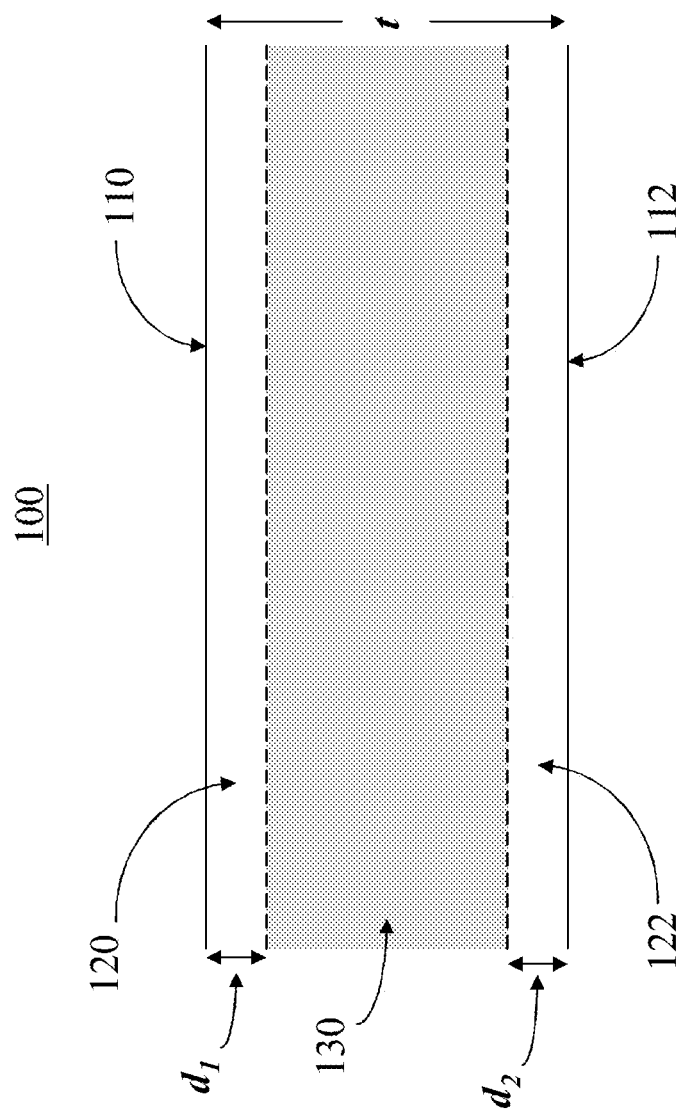
FIG. 1 is a cross-sectional schematic view of an ion exchanged planar glass article.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Chemical strengthening, also called ion-exchange (IOX), of glass refers to the exchange of smaller cation (e.g., monovalent alkali metal cations such as Li$^+$ and Na$^+$) in the glass for larger monovalent cations (e.g., K$^+$) in an external medium, such as a molten salt bath, at temperatures below the strain point of the glass. The ion exchange process is used to impart a compressive stress profile extending from the surface of the glass to a particular depth following a complementary error function. High compressive stress gives high strength in bending as long as the flaw is encompassed in the depth of the compressive layer (depth of layer, or "DOL"). The stored compressive stress from both surfaces of the glass is balanced by stored tension, the allowable limit of which is set by the frangibility limit for a given glass thickness.

A cross-sectional schematic view of an ion exchanged planar glass article is shown in FIG. 1. Glass article 100 has a thickness t, first surface 110, and second surface 112. Glass article 100, in some embodiments, has a thickness t in a range from 0.05 mm up to about 4 mm. While the embodiment shown in FIG. 1 depicts glass article 100 as a flat planar sheet or plate, glass article 100 may have other configurations, such as three dimensional shapes or non-planar configurations. Glass article 100 has a first compressive layer 120 extending from first surface 110 to a depth of layer d$_1$ into the bulk of the glass article 100. In the embodiment shown in FIG. 1, glass article 100 also has a second compressive layer 122 extending from second surface 112 to a second depth of layer d$_2$. Glass article 100 also has a central region 130 that extends from d$_1$ to d$_2$. Central region 130 is under a tensile stress or central tension (CT), which balances or counteracts the compressive stresses of first and second compressive layers 120 and 122. The depth d$_1$, d$_2$ of first and second compressive layers 120, 122 protects the glass article 100 from the propagation of flaws introduced by sharp impact to first and second surfaces 110, 112 of glass article 100, while the compressive stress minimizes the likelihood of a flaw penetrating through the depth d$_1$, d$_2$ of first and second compressive layers 120, 122.

Figure 2:
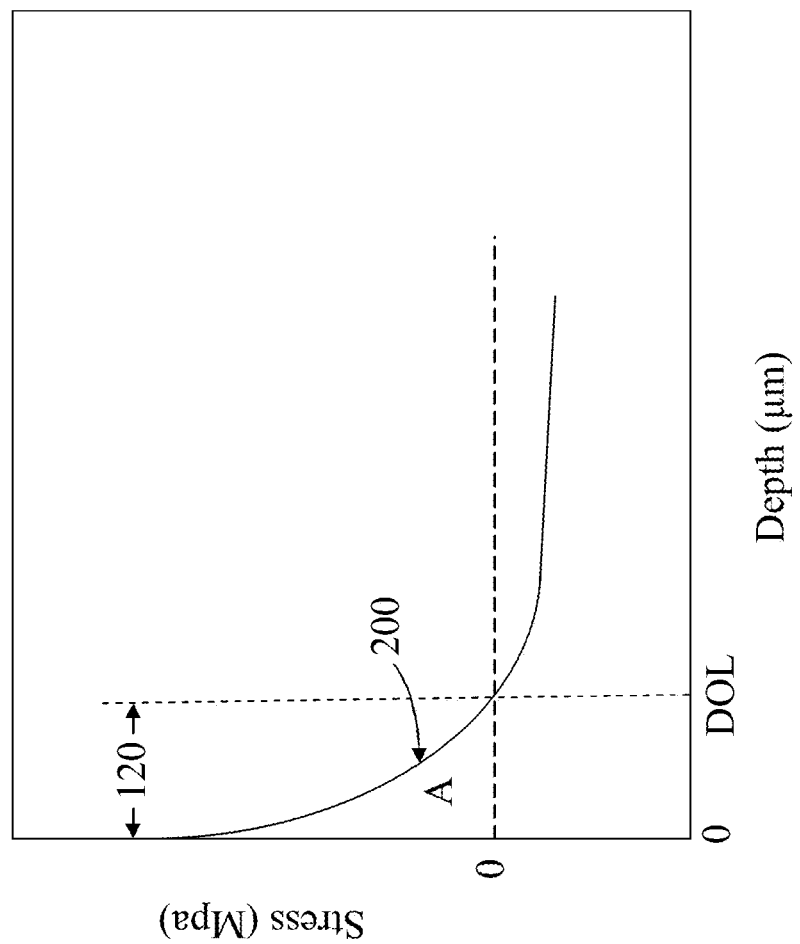
FIG. 2 is a plot of stress in an ion exchanged glass in which the compressive stress follows a complementary error function.

The limits of compressive stress and depth of layer are typically determined by the various allowable combinations that follow the complementary error function and remain below the frangibility limit. The stored compressive stress is represented by the area under the complementary error function from the surface to the depth of layer. As used herein, the terms "depth of layer" and "DOL" refer to zero stress point where the surface compression layer first transitions to tension. FIG. 2 is a plot of stress in an ion exchanged glass in which the compressive stress follows a complementary error function 200 in first compressive layer 120. The compressive stress has a maximum value at the surface of the glass (depth=0 μm) and steadily decreases through first compressive layer 120 until the depth of layer DOL is reached, at which point the compressive stress transitions to tension and the total stress is equal to zero.

A deep compressive layer provides damage resistance; i.e. the ability to retain strength as the flaw depths become larger with more severe contacts with the glass. While it may be desirable to achieve both high compressive stress and deep depth of compressive layer, a limit is set by the transition to frangible behavior as the stored energy exceeds a safe limit, referred to herein as the "frangibility limit." The stored compressive stress is represented by the area A under the complimentary error function 200 from the surface to the depth of layer. The stored compressive stress from both surfaces is balanced by the stored central tension CT, the allowable limit of which is set by the frangibility limit for a given glass thickness. The limits of compressive stress and depth of layer are determined by the various allowable combinations that follow the complimentary error function 200 and remain below the frangibility limit.

As described herein, a chemically strengthened—i.e., ion exchanged—glass that is damage resistant for applications such as, but not limited to, cover glasses for portable and stationary electronic devices, architectural and automotive glazing/windows, and glass containers is provided. The glass has a first region under compressive stress (e.g., first and second compressive layers 120, 122 in FIG. 1) extending from the surface to a depth of layer DOL of the glass and a second region (e.g., central region 130 in FIG. 1) under a tensile stress or central tension CT extending from the depth of layer into the central or interior region of the glass.

Figure 3:
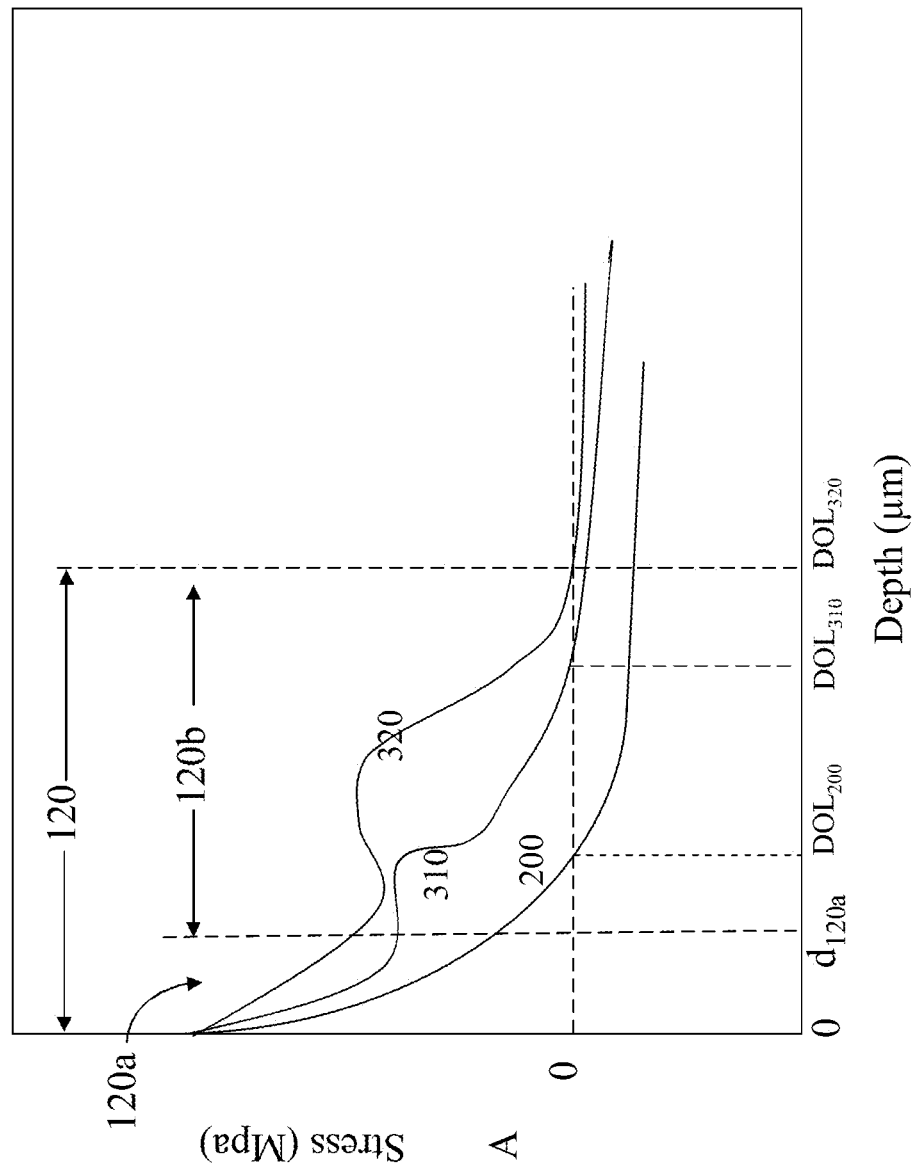
FIG. 3 is a schematic plot comparing examples of compressive stress profiles that do not follow complementary error functions with a compressive stress profile that follows a complementary error function.

The compressive stress CS has a maximum compressive stress CS$_1$ at its surface and a compressive stress that varies with distance d from the surface according to a function that is different from (i.e., other than) a complementary error function. Examples of such compressive stress functions 310, 320 of possible compressive stress profiles of the glasses described herein are schematically shown and compared to complementary error function 200 in FIG. 3. Referring to compressive stress function 320 in particular, region 120 (FIG. 1) comprises a first segment 120a in which compressive stress function 320 is a first complementary error function, and a second segment 120b, located between first segment 120a and central region 130, in which compressive stress follows a second function that differs from the first complementary error function.

As used herein, the terms "error function" and "Erf" refer to the function which is twice the integral of a normalized Gaussian function between 0 and $x/\sigma\sqrt{2}$, and the terms "complementary error function" and "Erfc" are equal to one minus the error function; i.e., Erfc(x)=1−Erf(x).

First segment 120a extends from first surface 110 to a depth $d_{120a}$ and defines the surface compression or compressive stress CS of glass 100. In some embodiments, the compressive stress is at least 400 MPa, in other embodiments, at least about 600 MPa, and in still other embodiments, at least about 800 MPa. The depth of layer DOL of each of first and second compressive layers 120, 122 is at least about 50 μm and, in some embodiments, at least about 100 μm.

The function or functions in second segment 120b may include a second complementary error function, a diffusion tail, or the like. Second segment 120b is located between $d_{120a}$ and the depth of layer DOL. Compressive stress functions 310, 320 in FIG. 3 each have at least one inflection point and the compressive stress reaches a local maximum $CS_2$ and/or local minimum $CS_3$ below the surface 110 of the glass. In some embodiments, first compressive layer 120 may comprise more than two segments with each segment having a compressive stress that follows a function other than the function characterizing adjacent segment or segments.

The stored compressive stress of both major surfaces (110, 112 in FIG. 1) is balanced by stored tension in the central region (130) of the glass, the allowable limit of which is set by the frangibility limit for a given glass thickness. The frangibility limit and frangibility are described in U.S. Pat. No. 8,075,999 by Kristen L. Barefoot et al., entitled "Strengthened Glass Articles and Method of Making," filed Aug. 7, 2009, and claiming priority to U.S. Provisional Patent Application No. 61/087,324, filed on Aug. 8, 2008, the contents of which are incorporated herein by reference in their entirety. As described in U.S. Pat. No. 8,075,999, frangibility or frangible behavior is characterized by at least one of: breaking of the strengthened glass article (e.g., a plate or sheet) into multiple small pieces (e.g., 1 mm); the number of fragments formed per unit area of the glass article; multiple crack branching from an initial crack in the glass article; and violent ejection of at least one fragment a specified distance (e.g., about 5 cm, or about 2 inches) from its original location; and combinations of any of the foregoing breaking (size and density), cracking, and ejecting behaviors. The terms "frangible behavior" and "frangibility" refer to those modes of violent or energetic fragmentation of a strengthened glass article absent any external restraints, such as coatings, adhesive layers, or the like. While coatings, adhesive layers, and the like may be used in conjunction with the strengthened glasses described herein, such external restraints are not used in determining the frangibility or frangible behavior of the glass articles.

Figure 4:
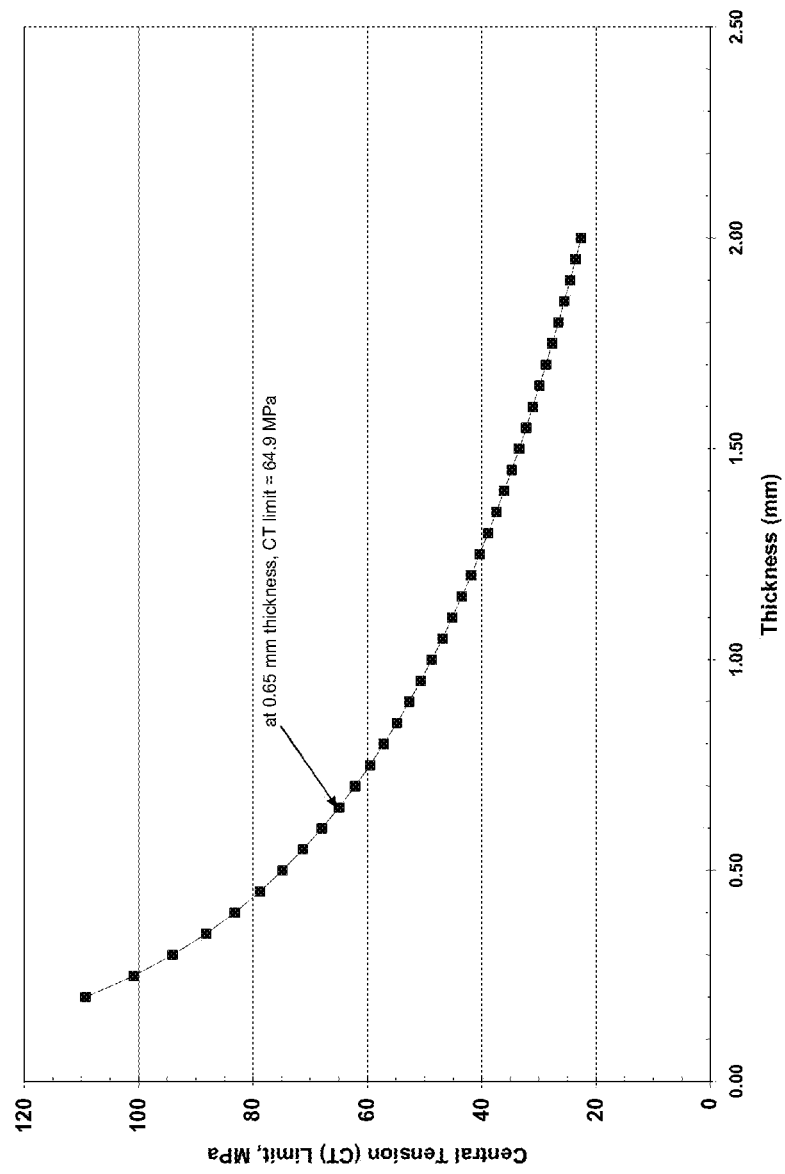
FIG. 4 is a plot of the frangibility limit $CT_{limit}$ for traditionally strengthened glass having a compressive stress profile that follows a complementary error function as a function of thickness t.

The limits of compressive stress CS and depth of layer DOL are determined by the various allowable combinations that follow the complimentary error function and remain below the frangibility limit. FIG. 4 is a plot of the frangibility limit $CT_{limit}$ for traditionally strengthened glass having a compressive stress profile that follows a complementary error function as a function of thickness t, as taught by U.S. Pat. No. 8,075,999. Glass articles are frangible above the line shown in FIG. 4. Central tension CT may be determined from the compressive stress CS, depth of layer DOL, and thickness t of the glass using the equation:

$$CT = (CS \cdot DOL)/(t - 2 \cdot DOL) \qquad (1)$$

which represents the upper limit of central tension CT with respect to a triangle approximation of the error function profile. The $CT_{limit}$ for traditionally strengthened glass (i.e., glasses in which the compressive stress profile is characterized by a single complementary error function) for a given thickness t of glass can be determined by the equation $$CT_{limit}(MPa) = -37.6(MPa/mm) \cdot \ln(t)(mm) + 48.7 \text{ (MPa)}, \qquad (2)$$

where the $CT_{limit}$, glass thickness t is expressed in millimeters (mm), where t≤1 mm, and ln(t) is the natural logarithm (base e) of the thickness t.

Therefore in order to stay below the frangibility limit for traditionally strengthened glass having a complementary error function compressive stress profile the following is required for CS and DOL as shown in Equation 3:

$$(CS \cdot DOL)/(t - 2 \cdot DOL) \leq \qquad (3)$$

The glasses and methods described herein provide compressive stress profiles that allow a combination of higher surface compressive stress and deeper depth of layer than would be otherwise be allowable when using a complementary error function profile. As shown in Equation 3, $CT_{limit}$ is still calculated from a triangle approximation of a traditional complimentary error function profile, but the central tension CT of the glasses described herein may exceed $CT_{limit}$:

$$(CS \cdot DOL)/(t - 2 \cdot DOL) > CT_{limit} \qquad (4)$$

The glasses described herein may comprise or consist of any glass that is chemically strengthened by ion exchange. In some embodiments, the glass is an alkali aluminosilicate glass.

In one embodiment, the alkali aluminosilicate glass comprises: from about 64 mol % to about 68 mol % $SiO_2$; from about 12 mol % to about 16 mol % $Na_2O$; from about 8 mol % to about 12 mol % $Al_2O_3$; from 0 mol % to about 3 mol % $B_2O_3$; from about 2 mol % to about 5 mol % $K_2O$; from about 4 mol % to about 6 mol % MgO; and from 0 mol % to about 5 mol % CaO; wherein: 66 mol % $SiO_2+B_2O_3+CaO$ 69 mol %; $Na_2O+K_2O+B_2O_3+MgO+CaO+SrO>10$ mol %; 5 mol % MgO+CaO+SrO 8 mol %; ($Na_2O+B_2O_3$)—$Al_2O_3$ 2 mol %; 2 mol % $Na_2O$—$Al_2O_3$ 6 mol %; and 4 mol % ($Na_2O+K_2O$)—$Al_2O_3$ 10 mol %. The glass is described in U.S. Pat. No. 7,666,511 by Adam J. Ellison et al., entitled "Down-Drawable, Chemically Strengthened Glass for Cover Plate," filed Jul. 27, 2007, and claiming priority to U.S. Provisional Patent Application No. 60/930,808, filed on May 18, 2007, the contents of which are incorporated herein by reference in their entirety.

In another embodiment, the alkali aluminosilicate glass comprises: at least one of alumina and boron oxide, and at least one of an alkali metal oxide and an alkali earth metal oxide, wherein—15 mol %≤($R_2O+R'O$—$Al_2O_3$—$ZrO_2$)—$B_2O_3$≤4 mol %, where R is one of Li, Na, K, Rb, and Cs, and R' is one of Mg, Ca, Sr, and Ba. In some embodiments, the alkali aluminosilicate glass comprises: from about 62 mol % to about 70 mol. % $SiO_2$; from 0 mol % to about 18 mol % $Al_2O_3$; from 0 mol % to about 10 mol % $B_2O_3$; from 0 mol % to about 15 mol % $Li_2O$; from 0 mol % to about 20 mol % $Na_2O$; from 0 mol % to about 18 mol % $K_2O$; from 0 mol % to about 17 mol % MgO; from 0 mol % to about 18 mol % CaO; and from 0 mol % to about 5 mol % $ZrO_2$. The glass is described in U.S. patent application Ser. No. 12/277,573 by Matthew J. Dejneka et al., entitled "Glasses Having Improved Toughness And Scratch Resistance," filed Nov. 25, 2008, and claiming priority to U.S. Provisional Patent Application No. 61/004,677, filed on Nov. 29, 2008, the contents of which are incorporated herein by reference in their entirety.

In another embodiment, the alkali aluminosilicate glass comprises: from about 60 mol % to about 70 mol % $SiO_2$; from about 6 mol % to about 14 mol % $Al_2O_3$; from 0 mol % to about 15 mol % $B_2O_3$; from 0 mol % to about 15 mol % $Li_2O$; from 0 mol % to about 20 mol % $Na_2O$; from 0 mol % to about 10 mol % $K_2O$; from 0 mol % to about 8 mol % MgO; from 0 mol % to about 10 mol % CaO; from 0 mol % to about 5 mol % $ZrO_2$; from 0 mol % to about 1 mol % $SnO_2$; from 0 mol % to about 1 mol % $CeO_2$; less than about 50 ppm $As_2O_3$; and less than about 50 ppm $K_2O_3$; wherein 12 mol %≤$Li_2O+Na_2O+K_2O$≤20 mol % and 0 mol % MgO+CaO≤10 mol %. The glass is described in U.S. patent application Ser. No. 12/392,577 by Sinue Gomez et al., entitled "Fining Agents for Silicate Glasses," filed Feb. 25, 2009, and claiming priority to U.S. Provisional Patent Application No. 61/067,130, filed on Feb. 26, 2008, the contents of which are incorporated herein by reference in their entirety.

In another embodiment, the alkali aluminosilicate glass comprises $SiO_2$ and $Na_2O$, wherein the glass has a temperature $T_{35kp}$ at which the glass has a viscosity of 35 kilo poise (kpoise), wherein the temperature $T_{breakdown}$ at which zircon breaks down to form $ZrO_2$ and $SiO_2$ is greater than $T_{35kp}$. In some embodiments, the alkali aluminosilicate glass comprises: from about 61 mol % to about 75 mol % $SiO_2$; from about 7 mol % to about 15 mol % $Al_2O_3$; from 0 mol % to about 12 mol % $B_2O_3$; from 9 mol % to about 21 mol % $Na_2O$; from 0 mol % to about 4 mol % $K_2O$; from 0 mol % to about 7 mol % MgO; and 0 mol % to about 3 mol % CaO. The glass is described in U.S. patent application Ser. No. 12/856,840 by Matthew J. Dejneka et al., entitled "Zircon Compatible Glasses for Down Draw," filed Aug. 10, 2010, and claiming priority to U.S. Provisional Patent Application No. 61/235,762, filed on Aug. 29, 2009, the contents of which are incorporated herein by reference in their entirety.

In another embodiment, the alkali aluminosilicate glass comprises at least 50 mol % $SiO_2$ and at least one modifier selected from the group consisting of alkali metal oxides and alkaline earth metal oxides, wherein [($Al_2O_3$ (mol %)+$B_2O_3$ (mol %))/(Σ alkali metal modifiers (mol %))]>1. In some embodiments, the alkali aluminosilicate glass comprises: from 50 mol % to about 72 mol % $SiO_2$; from about 9 mol % to about 17 mol % $Al_2O_3$; from about 2 mol % to about 12 mol % $B_2O_3$; from about 8 mol % to about 16 mol % $Na_2O$; and from 0 mol % to about 4 mol % $K_2O$. The glass is described in U.S. patent application Ser. No. 12/858,490 by Kristen L. Barefoot et al., entitled "Crack And Scratch Resistant Glass and Enclosures Made Therefrom," filed Aug. 18, 2010, and claiming priority to U.S. Provisional Patent Application No. 61/235,767, filed on Aug. 21, 2009, the contents of which are incorporated herein by reference in their entirety.

In another embodiment, the alkali aluminosilicate glass comprises $SiO_2$, $Al_2O_3$, $P_2O_5$, and at least one alkali metal oxide ($R_2O$), wherein 0.75≤[($P_2O_5$ (mol %)+$R_2O$ (mol %))/$M_2O_3$ (mol %)]≤1.2, where $M_2O_3$=$Al_2O_3$+$B_2O_3$. In some embodiments, the alkali aluminosilicate glass comprises: from about 40 mol % to about 70 mol % $SiO_2$; from 0 mol % to about 28 mol % $B_2O_3$; from 0 mol % to about 28 mol % $Al_2O_3$; from about 1 mol % to about 14 mol % $P_2O_5$; and from about 12 mol % to about 16 mol % $R_2O$; and, in certain embodiments, from about 40 to about 64 mol % $SiO_2$; from 0 mol % to about 8 mol % $B_2O_3$; from about 16 mol % to about 28 mol % $Al_2O_3$; from about 2 mol % to about 12% $P_2O_5$; and from about 12 mol % to about 16 mol % $R_2O$. The glass is described in U.S. patent application Ser. No. 13/305,271 by Dana C. Bookbinder et al., entitled "Ion Exchangeable Glass with Deep Compressive Layer and High Damage Threshold," filed Nov. 28, 2011, and claiming priority to U.S. Provisional Patent Application No. 61/417,941, filed Nov. 30, 2010, the contents of which are incorporated herein by reference in their entirety.

In still other embodiments, the alkali aluminosilicate glass comprises at least about 4 mol % $P_2O_5$, wherein ($M_2O_3$ (mol %))/$R_xO$(mol %))<1, wherein $M_2O_3$=$Al_2O_3$+$B_2O_3$, and wherein $R_xO$ is the sum of monovalent and divalent cation oxides present in the alkali aluminosilicate glass. In some embodiments, the monovalent and divalent cation oxides are selected from the group consisting of $Li_2O$, $Na_2O$, $K_2O$, $Rb_2O$, $Cs_2O$, MgO, CaO, SrO, BaO, and ZnO. In some embodiments, the glass comprises 0 mol % $B_2O_3$. The glass is described in U.S. Provisional Patent Application No. 61/560,434 by Timothy M. Gross, entitled "Ion Exchangeable Glass with High Crack Initiation Threshold," filed Nov. 16, 2011, the contents of which are incorporated herein by reference in their entirety.

In still another embodiment, the alkali aluminosilicate glass comprises at least about 50 mol % $SiO_2$ and at least about 11 mol % $Na_2O$, and the compressive stress is at least about 900 MPa. In some embodiments, the glass further comprises $Al_2O_3$ and at least one of $B_2O_3$, $K_2O$, MgO and ZnO, wherein −340+27.1.$Al_2O_3$—28.7. $B_2O_3$+15.6.$Na_2O$−61.4.$K_2O$+8.1.(MgO+ZnO)≥0 mol %. In particular embodiments, the glass comprises: from about 7 mol % to about 26 mol % $Al_2O_3$; from 0 mol % to about 9 mol % $B_2O_3$; from about 11 mol % to about 25 mol % $Na_2O$; from 0 mol % to about 2.5 mol % $K_2O$; from 0 mol % to about 8.5 mol % MgO; and from 0 mol % to about 1.5 mol % CaO. The glass is described in U.S. Provisional Patent Application No. 61/503,734 by Matthew J. Dejneka et al., entitled "Ion Exchangeable Glass with High Compressive Stress," filed Jul. 1, 2011, the contents of which are incorporated herein by reference in their entirety.

In some embodiments, the alkali aluminosilicate glasses described hereinabove are substantially free of (i.e., contain 0 mol % of) of at least one of lithium, boron, barium, strontium, bismuth, antimony, and arsenic.

In some embodiments, the alkali aluminosilicate glasses described hereinabove are down-drawable by processes known in the art, such as slot-drawing, fusion drawing, re-drawing, and the like, and has a liquidus viscosity of at least 130 kilopoise.

A method of providing a glass with a compressive stress profile that does not follow a complementary error function, such as those glasses described hereinabove, is also provided. The glass is first ion exchanged with an ion exchange medium. The ion exchange medium may be a molten salt bath, a gel, a paste, or the like, and comprises a salt that comprises a first cation. The first cation replaces a second, smaller cation in the glass to a first depth of layer, creating a first compressive stress within the first depth of layer. The first compressive stress varies with distance into the glass according to a complementary error function. This step can be modified to fix the starting compressive stress and depth of layer at any desirable level, and does not need to be constrained by the frangibility limit $CT_{limit}$.

Following ion exchange, the surface compressive stress is relaxed and the first ions are diffused deeper into the glass to a second depth of layer that is greater than the first depth of layer. In some embodiments, this step comprises heating the glass at a temperature that is less than the strain point of the glass. The step of heating the ion exchanged glass to this temperature results in a local maximum of compressive stress at a depth below the surface—i.e., a compressive stress maximum that is "buried" below the surface of the glass.

Following the step in which the surface compressive stress of the glass is relaxed, the glass is again ion exchanged to re-establish the surface compressive stress. As with the first ion exchange step, the ion exchange is carried out by bringing the glass into contact with a medium, which may be a molten salt bath, a gel, a paste, or the like, and comprises a salt that comprises a first cation to create a second surface compressive stress in the glass. In some embodiments, the second ion exchange is carried out for a shorter period of time than the first ion exchange.

The compressive stress profile (i.e., the variation of compressive stress CS) obtained after the second ion exchange of the glass varies according to a function other than—and different from—a complementary error function, and may take the form of those functions previously described hereinabove and shown in the accompanying figures.

The glasses and method described herein achieve higher combinations of CS and DOL while remaining under the frangibility limit. Instances where a buried increase or local maximum of compressive stress is achieved can result in re-direction of cracking systems. Higher compressive stress also allows the glass to pass handling, ball drop, and as made ring-on-ring strength testing. The deeper depth of compressive stress layer also provides damage resistance; i.e. the ability to retain strength as the flaw depths become larger with more severe contacts.

EXAMPLES

The following examples illustrate the features and advantages of the glass and methods described herein and are in no way intended to limit the disclosure or appended claims thereto.

Four examples of glasses having the nominal composition: 69 mol % $SiO_2$; 10 mol % $Al_2O_3$; 14 mol % $Na_2O$; 1. mol % $K_2O$; 6 mol % $MgO$; 0.5 mol % $CaO$; 0.01 mol % $ZrO_2$; 0.2 mol % $SnO_2$; and 0.01 mol % $Fe_2O_3$ were prepared and ion exchanged according to the methods described herein to achieve stress profiles that do not follow a single complementary error function. Stress measurements and depth profiles were made using interferometry on 650 μm diameter rods of the ion exchanged glass. The method was limited to measuring stresses inside the first 5-10 μm of the rods. Corrections for surface compression were done using FSM measurements on 1.3 mm thick flat glass samples.

The method consisted of three steps. The first step was to ion-exchange the glass to contain a standard complementary error function stress profile. Ion exchange Step 1 for the samples shown in FIGS. 4-6 was an 8 hour immersion treatment in a $KNO_3$ salt bath at 410° C., which resulted in typical complimentary error function profile with a DOL of 44 microns and a CS of 595 MPa for each sample. This treatment resulted in a depth of layer (DOL) of about 44 μm and a compressive stress (CS) of about 595 MPa, although Step 1 may be modified to fix the starting CS and DOL at any desirable level and does not need to be constrained by the central tension $CT_{limit}$ established by frangibility testing.

In Step 2 the ion exchanged glass samples were heat treated at a temperature below the strain point of the glass for a desired amount of time to promote diffusion of potassium to extend the depth of the DOL, while at the same time relaxing the surface compressive stress in the samples. This step results in a compressive stress maximum "buried" beneath the surface of the glass rather than at the surface. The samples shown in FIGS. 5-7, were heat treated at 500° C. for 90 minutes in a $N_2$ atmosphere, which resulted in an extension of the DOL beyond the DOL achieved in Step 1. The choice of heat treatment temperature and time depends on the rate of stress relaxation and rate of diffusion for a given glass composition at a given temperature.

Figure 5:
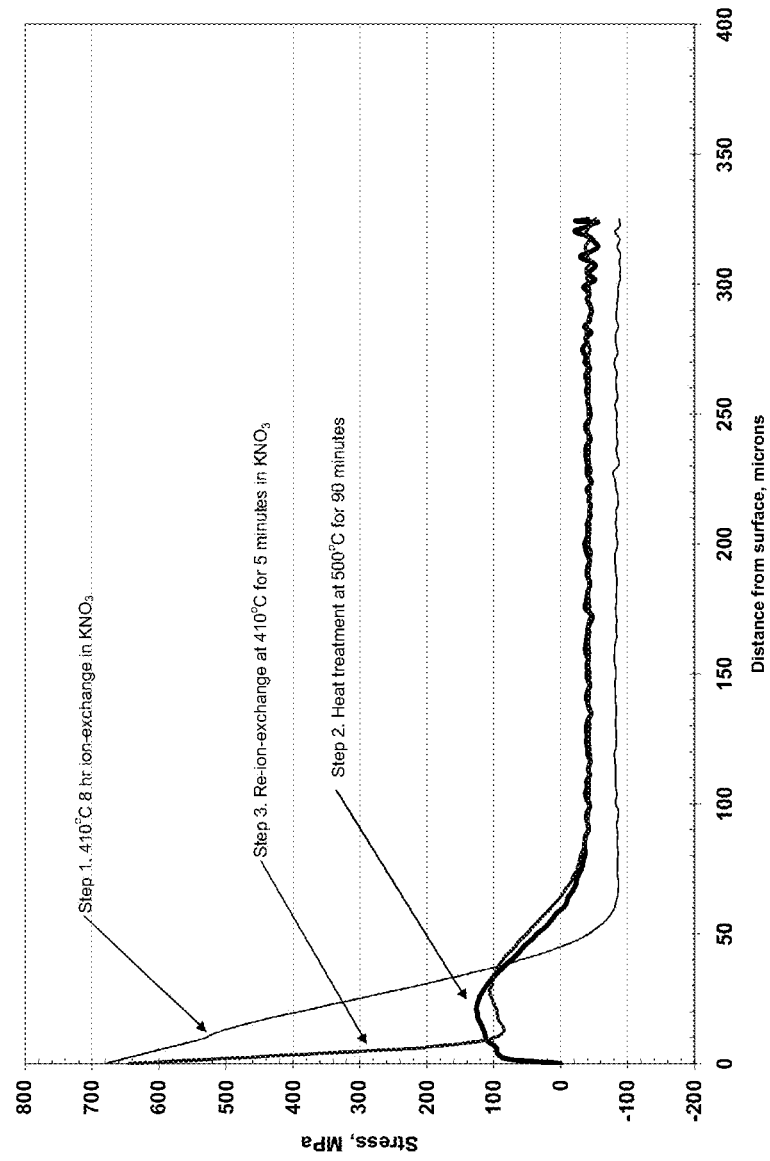
FIG. 5 is a plot of compressive stress vs. thickness for glass samples that were 1) ion exchanged at 410° C. for 8 hours in $KNO_3$ salt; 2) heat treated at 500° C. for 90 minutes; and 3) re-ion-exchanged at 410° C. for 5 minutes in $KNO_3$ salt.

In Step 3, a second ion-exchange for short amounts of time re-establishes the surface compressive stress. In FIG. 5, the second ion-exchange at 410° C. for 5 minutes resulted in a CS spike at the surface and a buried region of increasing CS from the overlapping of profiles from Steps 2 and 3. Step 3 also resulted in a buried compression layer total DOL of about 64 μm and a CS of about 684 MPa.

Figure 6:
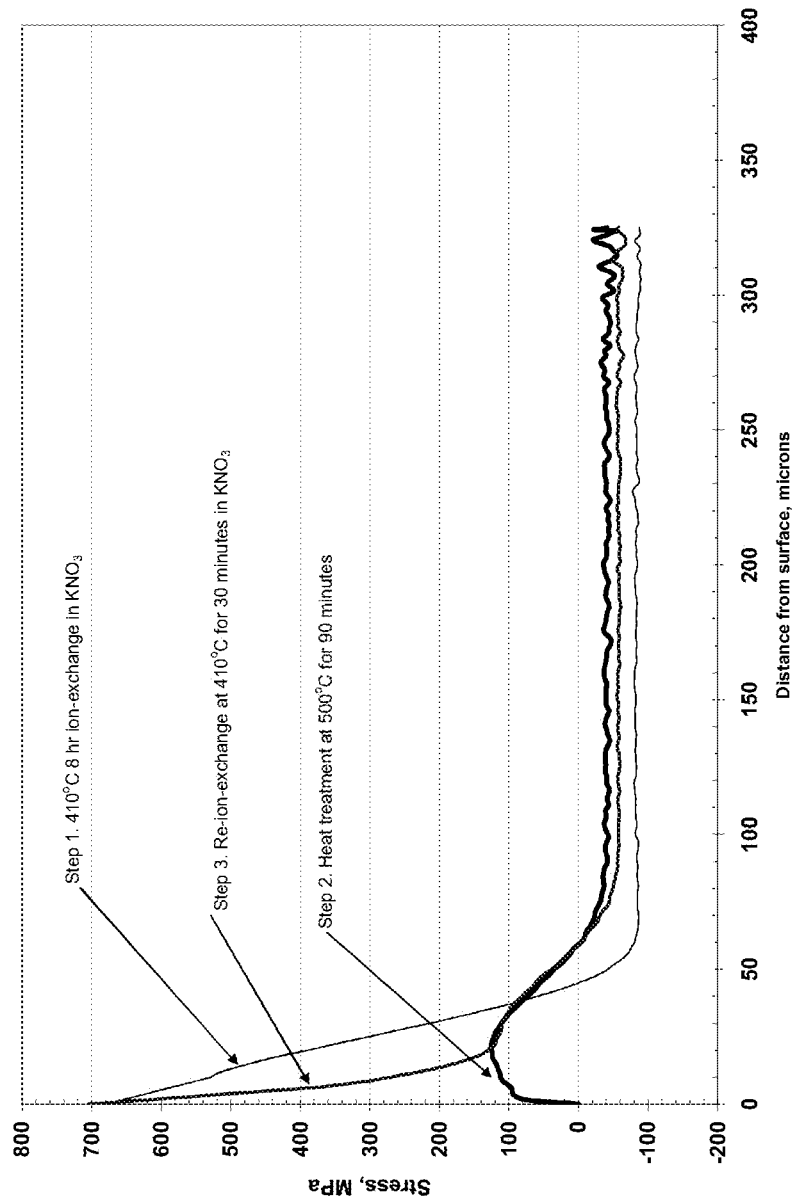
FIG. 6 is a plot of compressive stress vs. thickness for glass samples that were 1) ion exchanged at 410° C. for 8 hours in $KNO_3$ salt; 2) heat treated at 500° C. for 90 minutes; and 3) re-ion-exchanged at 410° C. for 30 minutes in $KNO_3$ salt.

In FIG. 6, the second ion-exchange at 410° C. for 30 minutes resulted in a higher CS at the surface and a shoulder appears from the overlapping of profiles from Steps 2 and 3. Step 3 also resulted in a buried compression layer total having DOL of about 59 microns and a CS of about 744 MPa.

Figure 7:
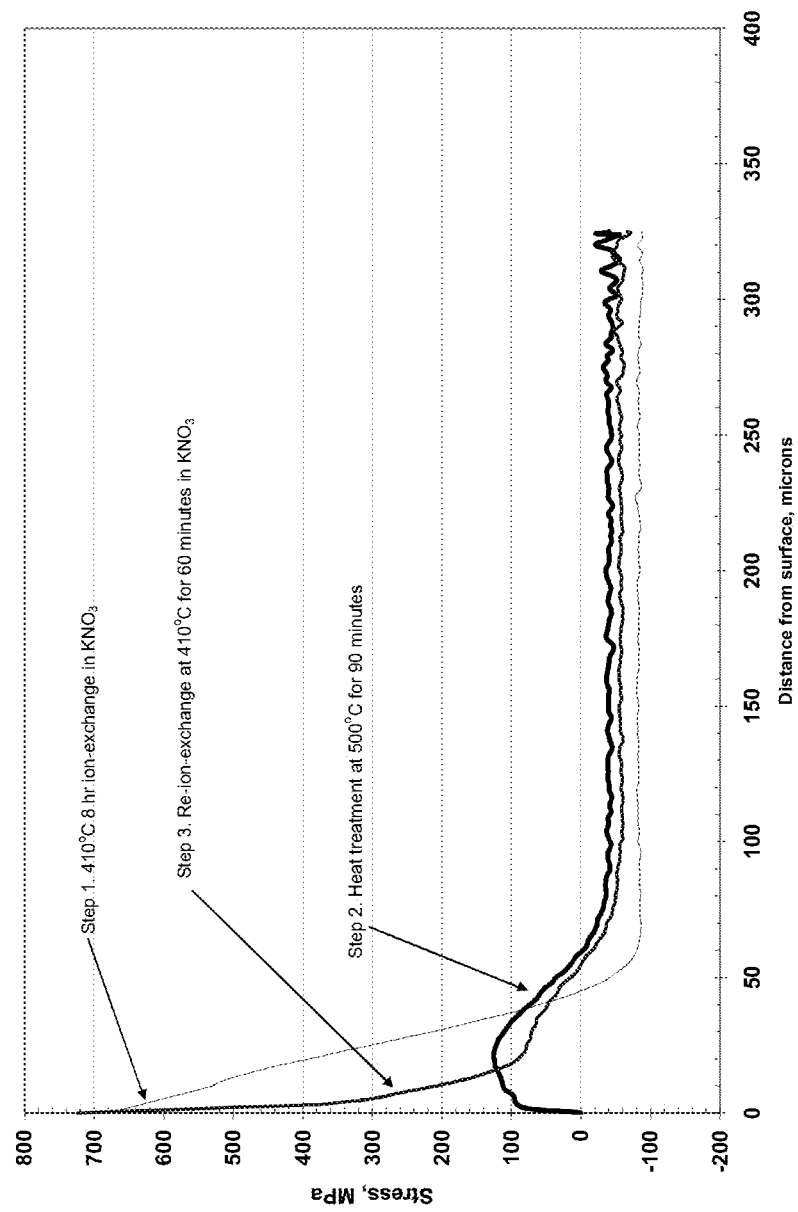
FIG. 7 is a plot of compressive stress vs. thickness for glass samples that were 1) ion exchanged at 410° C. for 8 hours in $KNO_3$ salt; 2) heat treated at 500° C. for 90 minutes; and 3) re-ion-exchanged at 410° C. for 60 minutes in $KNO_3$ salt.

In FIG. 7, the second ion-exchange at 410° C. for 60 minutes resulted in a profile with the surface CS spike extending deeper into the glass. Step 3 also resulted in a buried compression layer total having DOL of about 55 microns and a CS of about 749 MPa.

Figure 8:
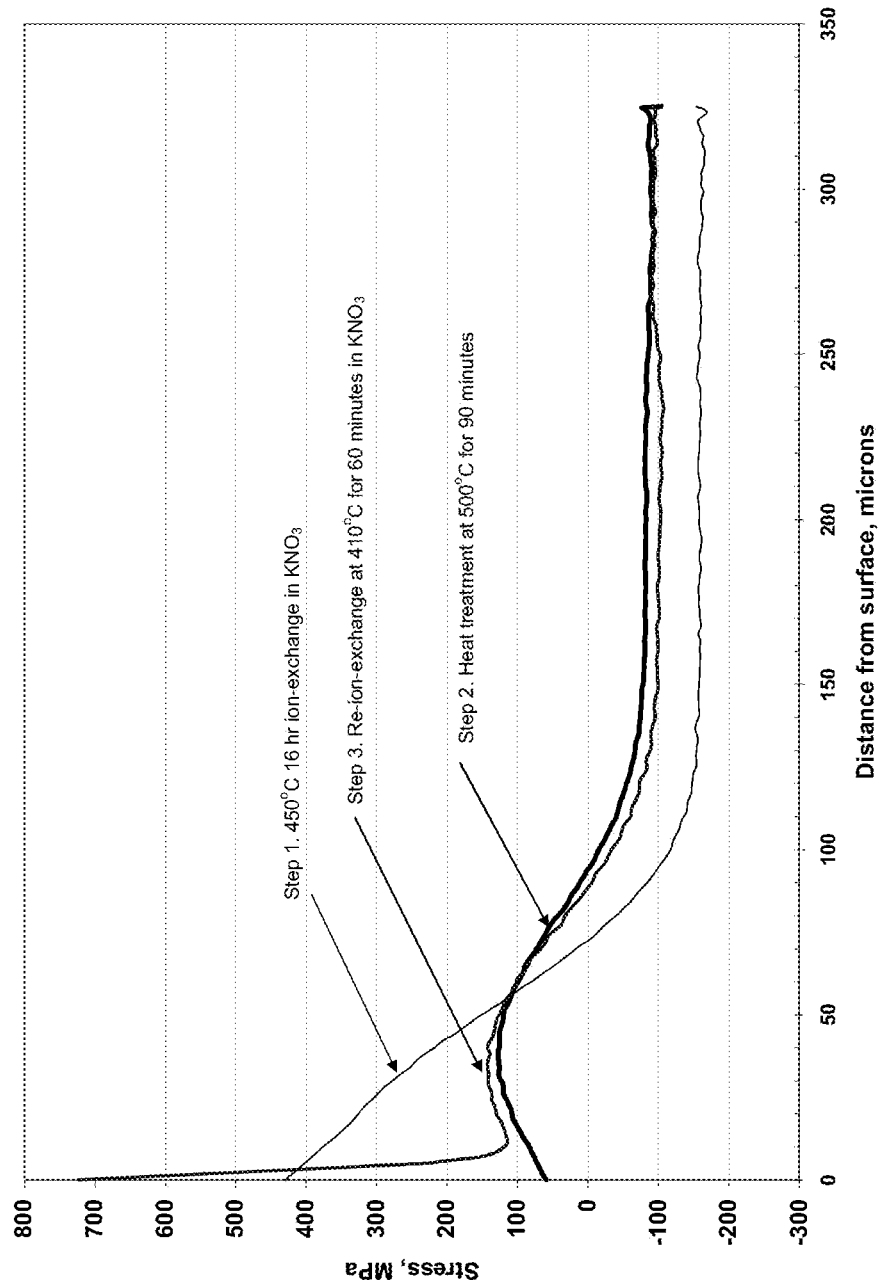
FIG. 8 is a plot of compressive stress vs. thickness for glass samples that were 1) ion exchanged at 410° C. for 16 hours in KNO$_3$ salt; 2) heat treated at 500° C. for 90 minutes; and 3) re-ion-exchanged at 410° C. for 60 minutes in KNO$_3$ salt.

The glass samples shown in FIG. 8 were ion-exchanged in Step 1 for 16 hours in $KNO_3$ salt at 450° C., resulting in typical complimentary error function profile. In Step 2, the glass samples were heat treated at 500° C. for 90 minutes to relax the compressive stress at the surface and drive diffusion of potassium ions to greater depth resulting in deeper depth of compressive layer. In Step 3, the samples were re-ion-exchanged for 60 minutes in $KNO_3$ salt at 410° C. salt to re-establish high surface compression. Step 3 also resulted in a buried compression layer total having DOL of about 90 μm and a CS of about 740 MPa.

Figure 9:
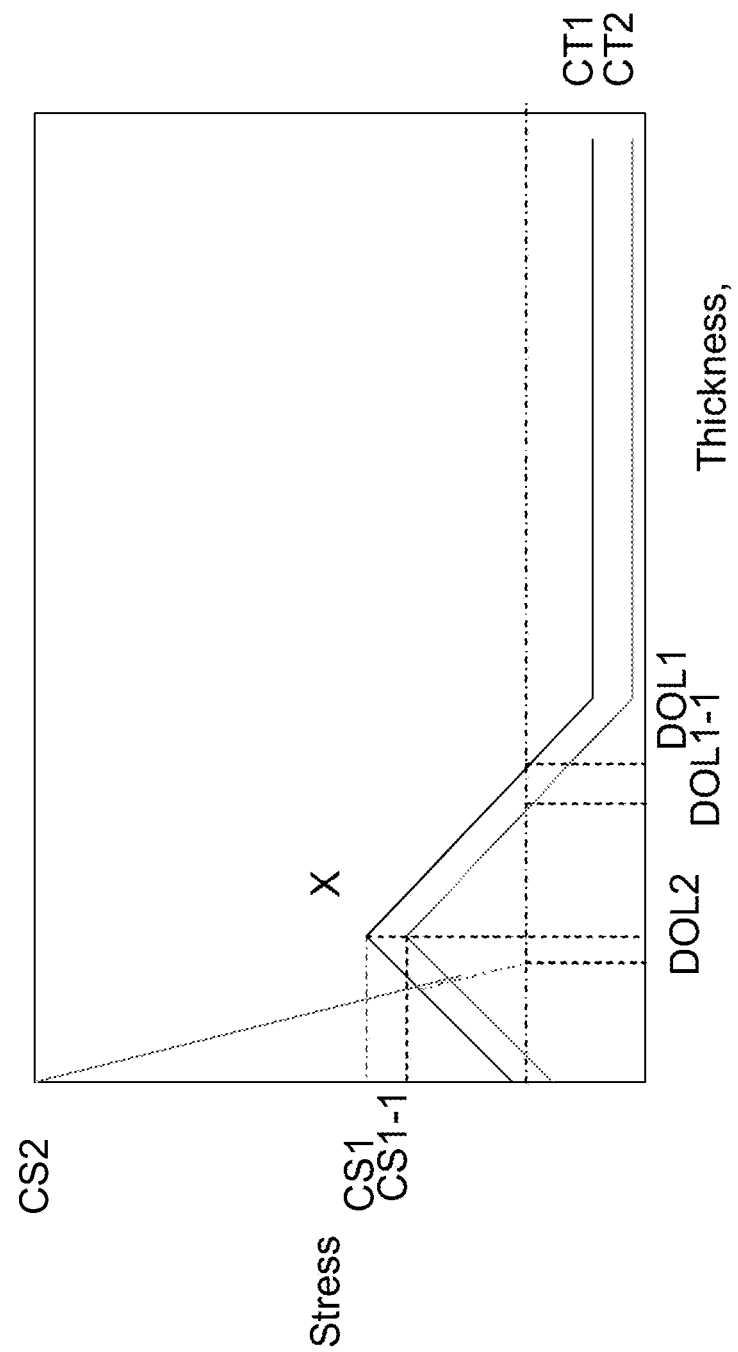
FIG. 9 is a plot of modeled examples of compressive stress profiles for an ion exchanged glass.

Modeled examples of compressive stress profiles for flat glass are shown in FIG. 9. The overall stress A, expressed as a function A(L) of depth L can be described as $$A(L) = (A1 \cdot Erf(L/b1) - CT1) \cdot (1 - \exp(-(L/b2)^{1.2})) + Erf(L/b3) - CT2. \quad (5)$$

The term A1 is the peak compressive stress after the first ion exchange step without considering a stress relaxation effect contribution, CT1 is the compressive stress after the first ion exchange step and subsequent relaxation step, and b1 and Erf(L/b1) are the depth of the ion exchanged layer and the error function of the stress profile, respectively, associated with the first ion exchange step. The term b2 is the depth of stress relaxation after the first ion exchange step. A2 is the peak compressive stress after the stress relaxation step, which follows the first ion exchange step. The terms b3 and CT2 are the depth of the ion exchanged layer and the central tension adjustment, respectively, after the second ion exchange step.

Using equation (1), the central tension CT1 after the first ion exchange and subsequent relaxation step is given by the equation $$CT1 = (CS1 \cdot DOL1)/(t - 2 \cdot DOL1) \quad (6)$$

where compressive stress CS1 is the peak value or local maximum (X in FIG. 9) of the compressive stress that is "buried (i.e., located beneath the surface of the glass)" at DOL2 in the compressive layer. Following the second ion exchange step, the central tension decreases to a second value CT2, CS1 and DOL1 decrease to CS1-1 and DOL1-1, respectively, and a maximum compressive stress CS2 is achieved at the surface (thickness=0):

$$CT2=(CS2\cdot DOL2)/(t-2\cdot DOL2) \qquad (7)$$

In some embodiments, the total tensile stress CT=CT1+CT2 should be less than or equal to the frangibility limit $CT_{limit}$ (equation (3)). The total tensile stress CT is obtained by adding equations (6) and (7):

$$CT=(CS1\cdot DOL1)/(t-2\cdot DOL1)+(CS2\cdot DOL2)/(t-2\cdot DOL2) \qquad (8)$$

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass having a surface and a thickness t of from 0.05 mm to 1.3 mm,
the glass comprising:
a first region under a compressive stress, the first region extending from the surface to a depth of layer DOL in the glass, wherein the compressive stress CS has a maximum compressive stress CS1 at the surface and varies with distance d from the surface according to a function other than a complementary error function; and
a second region under tensile stress, the second region extending from the depth of layer into the glass, wherein for the second region a value $CT_C$ determined by triangle approximation is equal to $[(CS_1 \cdot DOL)/(t-(2 \cdot DOL)]$, and further wherein $CT_C$, expressed in MPa, is greater than $-37.6 \ln(t)(MPa)+48.7(MPa)$; and the second region further comprising an achieved central tension $CT_A$, expressed in MPa, that is less than $-37.6 \ln(t)(MPa)+48.7(MPa)$.

2. The glass of claim 1, wherein the first region comprises:
a. a first segment, the first segment extending from the surface to a first depth $d_1$, wherein the depth $d_1$ is less than the depth of layer DOL, wherein the compressive stress CS in the first segment varies according to a first function; and
b. a second segment, the second segment extending from the first depth $d_1$ up to the depth of layer DOL, wherein the compressive stress CS in the second segment varies according to a second function, and wherein the first function is different than the second function.

3. The glass of claim 2, wherein the first function is a first complementary error function.

4. The glass of claim 3, wherein the second function is a second complementary error function or a diffusion tail.

5. The glass of claim 2, wherein the compressive stress has a local maximum $CS_2$ in the second segment, wherein $CS_1 > CS_2$.

6. The glass of claim 1, wherein the glass is an alkali aluminosilicate glass having an alkali metal oxide concentration, wherein the alkali metal consists of Na or K.

7. The glass of claim 1, wherein the maximum compressive stress $CS_1$ is at least about 400 MPa.

8. The glass of claim 1, wherein the depth of layer DOL is at least about 40 μm.

9. The glass of claim 1, wherein the glass is ion exchanged.

10. The glass of claim 1, wherein $CT_A$ is about 40 MPa or more.

11. The glass of claim 10, wherein $CT_A$ is about 60 MPa or less.

* * * * *

UNITED STATES PATENT AND TRADEMARK OFFICE
CERTIFICATE OF CORRECTION

PATENT NO. : 11,492,291 B2  Page 1 of 1
APPLICATION NO. : 15/640726
DATED : November 8, 2022
INVENTOR(S) : Dana Craig Bookbinder et al.

It is certified that error appears in the above-identified patent and that said Letters Patent is hereby corrected as shown below:

In the Claims

In Column 11, Line 36, in Claim 1, delete "In(t)" and insert -- ln(t) --.

In Column 12, Line 3, in Claim 1, delete "In(t)" and insert -- ln(t) --.

Signed and Sealed this
Twenty-fifth Day of July, 2023

Katherine Kelly Vidal
*Director of the United States Patent and Trademark Office*